(12) United States Patent
Bollinger et al.

(10) Patent No.: US 11,964,535 B2
(45) Date of Patent: Apr. 23, 2024

(54) ELECTRIC AUTOMOTIVE VEHICLE

(71) Applicant: Bollinger Motors, INC., Oak Park, MI (US)

(72) Inventors: Robert Bollinger, Oak Park, MI (US); Brian Van Batavia, Oak Park, MI (US); Karl Hacken, Oak Park, MI (US); Erik Hardy, Oak Park, MI (US); John Dannenhoffer, Oak Park, MI (US); Charles Winegar, Oak Park, MI (US)

(73) Assignee: BOLLINGER MOTORS, INC., Oak Park, MI (US)

(\*) Notice: Subject to any disclaimer, the term of this patent is extended or adjusted under 35 U.S.C. 154(b) by 269 days.

(21) Appl. No.: 17/068,318

(22) Filed: Oct. 12, 2020

(65) Prior Publication Data

US 2021/0146776 A1  May 20, 2021

Related U.S. Application Data

(60) Provisional application No. 63/039,735, filed on Jun. 16, 2020, provisional application No. 62/936,929, filed on Nov. 18, 2019.

(51) Int. Cl.
*B60H 1/00* (2006.01)
*B60K 1/02* (2006.01)
(Continued)

(52) U.S. Cl.
CPC .......... *B60H 1/00278* (2013.01); *B60K 1/02* (2013.01); *B60K 1/04* (2013.01); *B60K 17/043* (2013.01);
(Continued)

(58) Field of Classification Search
CPC .................................................. B60H 1/00278
See application file for complete search history.

(56) References Cited

U.S. PATENT DOCUMENTS 5,960,901 A * 10/1999 Hanagan ............... B60L 3/0046
296/187.02
7,443,049 B1   10/2008 Jones et al.
(Continued)

FOREIGN PATENT DOCUMENTS

WO   2018/150008 A1   8/2018

OTHER PUBLICATIONS

International Search Report & Written Opinion, PCT Patent Application No. PCT/US2020/061018 dated May 27, 2021.
(Continued)

*Primary Examiner* — Michael A Berns
(74) *Attorney, Agent, or Firm* — The Dobrusin Law Firm, P.C.

(57) ABSTRACT

An electric automotive vehicle gross vehicle rating of greater than 10,000 pounds includes an electric powertrain connected to the frame and positioned at a base of the frame. The vehicle includes a first central axis, and the weight of the electric powertrain is centered about the first central axis. All drivetrain components of the vehicle other than the electric powertrain may be positioned above the base of the electric powertrain. The vehicle includes two electric drive units configured to drive the front and rear axles respectively. The electric drive units consist of an electric motor, motor controller, two speed electrically actuated gearbox, electrically actuated park lock, and electrically actuated locking differential. The drive units transmit power to inboard mounted brakes, which in turn are connected by constant velocity driveshaft to the wheel hubs where a further final gear reduction resides. Additionally, the suspension of the vehicle utilizes a dynamically adjustable hydraulic suspen-
(Continued)

sion that is capable of automatically leveling the vehicle and also provides capability to adjust nominal vehicle ride height. The vehicle is capable of multiple modes of operation, and in one mode the vehicle is able to export electrical power for usage outside of the vehicle. The vehicle body has been designed in multiple embodiments, including a sport utility model and pickup truck model. Additionally, each embodiment is designed with available two door and four door variants. All vehicle variants utilize the aforementioned common powertrain and chassis.

19 Claims, 36 Drawing Sheets

(51) Int. Cl.
  *B60K 1/04*  (2019.01)
  *B60K 17/04*  (2006.01)
  *B60K 17/356*  (2006.01)
  *B60L 15/20*  (2006.01)
  *H01M 10/625*  (2014.01)
  *B60K 1/00*  (2006.01)

(52) U.S. Cl.
  CPC ............ *B60K 17/356* (2013.01); *B60L 15/20* (2013.01); *H01M 10/625* (2015.04); *B60H 2001/00307* (2013.01); *B60K 2001/001* (2013.01); *B60K 2001/005* (2013.01); *B60K 2001/0438* (2013.01); *B60L 2240/461* (2013.01); *B60L 2240/463* (2013.01)

(56) References Cited

U.S. PATENT DOCUMENTS

| | | | | |
|---|---|---|---|---|
| 8,453,773 | B2* | 6/2013 | Hill | ............ B60L 58/18 180/68.5 |
| 9,630,623 | B2* | 4/2017 | Fairgrieve | ............ F16H 61/0213 |
| 9,975,425 | B2* | 5/2018 | Monfette | ............ B60K 17/344 |
| 10,003,112 | B1 | 6/2018 | Boor et al. | |
| 10,308,132 | B2* | 6/2019 | Milton | ............ B60L 1/00 |
| 10,553,874 | B2* | 2/2020 | Elam | ............ H01M 4/628 |
| 10,611,234 | B1 | 4/2020 | Berels et al. | |
| 11,133,555 | B2* | 9/2021 | Suzuki | ............ H01M 10/6569 |
| 11,355,800 | B2 | 6/2022 | Shimizu | |
| 11,505,061 | B2* | 11/2022 | Mepham | ............ B60K 1/00 |
| 11,563,252 | B2 | 1/2023 | Masaryk et al. | |
| 2002/0104704 | A1 | 8/2002 | Chang | |
| 2008/0277175 | A1 | 11/2008 | Tyler et al. | |
| 2009/0174158 | A1 | 7/2009 | Anderson et al. | |
| 2010/0025131 | A1 | 2/2010 | Gloceri et al. | |
| 2011/0018219 | A1* | 1/2011 | Oriet | ............ B60G 17/0416 280/124.112 |
| 2013/0164578 | A1* | 6/2013 | Sweet | ............ H01M 10/0481 429/82 |
| 2015/0246590 | A1 | 9/2015 | Fairgrieve et al. | |
| 2017/0320388 | A1 | 11/2017 | Monfette et al. | |
| 2018/0069281 | A1 | 3/2018 | Tutzer et al. | |
| 2018/0108887 | A1 | 4/2018 | Klomberg | |
| 2018/0154754 | A1 | 6/2018 | Rowley | |
| 2018/0175466 | A1 | 6/2018 | Seo | |
| 2018/0186227 | A1 | 7/2018 | Stephens | |
| 2018/0337374 | A1 | 11/2018 | Matecki et al. | |
| 2019/0157636 | A1 | 5/2019 | Miler | |
| 2019/0181405 | A1 | 6/2019 | Kim et al. | |
| 2019/0263413 | A1 | 8/2019 | Hancock et al. | |
| 2019/0267682 | A1 | 8/2019 | Seo et al. | |
| 2019/0283611 | A1 | 9/2019 | Conlon et al. | |
| 2019/0308545 | A1 | 10/2019 | Tagvoian et al. | |
| 2020/0067156 | A1 | 2/2020 | Chi | |
| 2020/0152935 | A1 | 5/2020 | Wynn | |
| 2020/0180417 | A1 | 6/2020 | Marquez Duran et al. | |
| 2020/0212525 | A1 | 7/2020 | Orino | |
| 2020/0227701 | A1 | 7/2020 | Suzuki | |
| 2020/0338963 | A1 | 10/2020 | Sukuki | |
| 2020/0384882 | A1 | 12/2020 | Falls et al. | |
| 2021/0138919 | A1* | 5/2021 | Weber | ............ H01R 13/6205 |
| 2021/0218087 | A1 | 7/2021 | Yoo | |
| 2022/0123389 | A1 | 4/2022 | Chopard | |
| 2022/0169124 | A1 | 6/2022 | Reithmeier | |
| 2022/0176791 | A1 | 6/2022 | Danneberg et al. | |
| 2022/0181730 | A1 | 6/2022 | Sun | |
| 2022/0247010 | A1 | 8/2022 | Ju | |
| 2022/0258586 | A1 | 8/2022 | Amsz | |
| 2022/0314773 | A1 | 10/2022 | Arsac | |
| 2022/0336900 | A1 | 10/2022 | Merino | |
| 2022/0344762 | A1 | 10/2022 | Bergmann et al. | |
| 2022/0393286 | A1 | 12/2022 | Cha | |
| 2022/0407147 | A1 | 12/2022 | Suzumori | |

OTHER PUBLICATIONS

International Preliminary Report on Patentability, PCT Patent Application No. PCT/US2020/061018 dated May 17, 2022.

\* cited by examiner

ELECTRIC AUTOMOTIVE VEHICLE

CROSS-REFERENCE TO RELATED APPLICATIONS

This application claims priority to U.S. Provisional Patent Application No. 62/936,929 filed on Nov. 18, 2019 and entitled ELECTRIC AUTOMOTIVE VEHICLE and to U.S. Provisional Patent Application No. 63/039,735 filed on Jun. 16, 2020 and entitled ELECTRIC AUTOMOTIVE VEHICLE, each of which are hereby incorporated by reference.

FIELD OF INVENTION

The present invention relates to an electric automotive vehicle and more specifically to numerous novel and innovative features to optimize and enhance performance of an electric automobile.

BACKGROUND

Traditional automotive vehicles with combustion engines typically are designed with the engine positioned inside the front hood of the vehicle. This positioning is due to weight distribution, space utilization, as well as other design constraints and optimization.

Electric automotive vehicles that do not employ traditional combustion engines are not subject to the same design constraints. Accordingly, designs of electric vehicles may be modified to optimize cargo room, weight distribution, and other characteristics of the vehicle.

Additionally, vehicles that are rated for 10,000 lbs or more have traditionally all utilized internal combustion engines. And those vehicles that do include electric powertrains have not been rated for handling 10,000 lbs. Similarly, commercial vehicles have been developed that have a gross vehicle weight rating above 10,000 lbs, but typically utilize internal combustion engines. Some large trucks with weight rating above well above 10,000 lbs have also been disclosed but are not all wheel drive.

Some vehicles also utilize an electric powertrain, but do not include any strategy for adapting or varying torque control. Similarly, vehicles have been developed that have an adaptive control strategy, but typically utilize a single torque producer (e.g. engine) in combination with one or more elements to restrict torque delivery to a given wheel (e.g. brake). Some vehicles are also equipped with torque vectoring mechanisms on a given axle (i.e. left to right) but may not adaptively adjust torque delivery from one axle to another (i.e. front to back).

In addition, some electric vehicles have been developed that are all wheel drive and utilize an electric drivetrain with front and rear drive units, but typically utilize a single high voltage electrical connection to the battery pack. Further, many vehicles fail to provide adequate structural means for holding and stabilizing battery modules within a battery pack, and also fail to provide adequate temperature monitoring and control of the battery pack.

Accordingly, an improved design of an electric automotive vehicle is needed in the industry.

SUMMARY

An electric automotive vehicle is generally presented. The electric automotive vehicle includes a plurality of wheels connected to a frame and an electric powertrain connected to the frame. The electric powertrain includes a plurality of batteries and is positioned at a base of the frame. The vehicle includes a first central axis, and the weight of the electric powertrain is centered about the first central axis.

In an embodiment, the central axis is an axis that is geometrically centered on the vehicle. The central axis may extend from a front of the vehicle to a rear of the vehicle. All drivetrain components of the vehicle other than the electric powertrain may be positioned above the base of the electric powertrain.

In an embodiment, the vehicle has a gross vehicle rating of greater than 10,000 pounds.

In an embodiment, the electric automotive vehicle includes a first drive unit configured to drive a front axle of the vehicle and a second drive unit configured to drive a rear axle of the vehicle. A gear reduction may be located at each wheel to further increase torque production at each wheel of the vehicle. The vehicle may be configured to sense speed and/or torque feedback at each wheel and adjust the torque provided to each wheel and balance the torque as needed based on the feedback.

In an embodiment, the vehicle includes an inverter charger to power auxiliary AC loads and outlets and to charge the plurality of batteries when plugged into an appropriate power source.

In an embodiment, the vehicle includes one or more vehicle controllers that are configured to be operably changed between an on-road mode and an off-road mode. The controller, when in on-road mode, is configured to initiate a change in the gearing of a gearbox at each drive unit to put them in a high range mode. The controller, when in off-road mode, is configured to initiate a change in the gearing at each gearbox to put them in a low range mode.

In an embodiment, the vehicle includes hydraulic cylinders located between the wheels and the frame, and further wherein the vehicle includes a hydraulic pump configured to provide hydraulic fluid to the hydraulic cylinders and vary the height of the vehicle based on the pressure and hydraulic fluid input into the hydraulic cylinders.

In an embodiment, the vehicle includes a plurality of power modes that dictate which systems within the vehicle are active and/or powered. The plurality of power modes may include a charge mode configured to turn the battery on or awake and capable of receiving a charge but restricted from powering any auxiliary or system devices, an export mode configured to turn the battery on and allow for only the AC outlets on the vehicle to be powered on while cutting power to all other components, and a mobility mode configured to turn on the battery and all powered components including drive train components.

In an embodiment, the vehicle includes a first electric drive configured to drive the front wheel axle through a first gearbox and a second electric drive configured to drive the rear wheel axle through a second gearbox. The vehicle may be configured to provide independent torque control of the front and rear wheel axles through regulation of the first and second electric drives. The vehicle may include front and rear brakes mounted in an inboard arrangement to a casing of the first and second gearboxes respectively. The first and second gearboxes may each include a high gear and a low gear.

In an embodiment, the battery includes a front facing and rear facing power connections to connect to a front electric drive and a rear electric drive respectively. The battery may comprise one or more battery strings, and wherein each battery string comprises a plurality of electrically coupled battery modules connected to temperature regulated I-beam.

BRIEF DESCRIPTION OF THE DRAWINGS

The operation of the invention may be better understood by reference to the detailed description taken in connection with the following illustrations, wherein.

DETAILED DESCRIPTION

Figure 1:
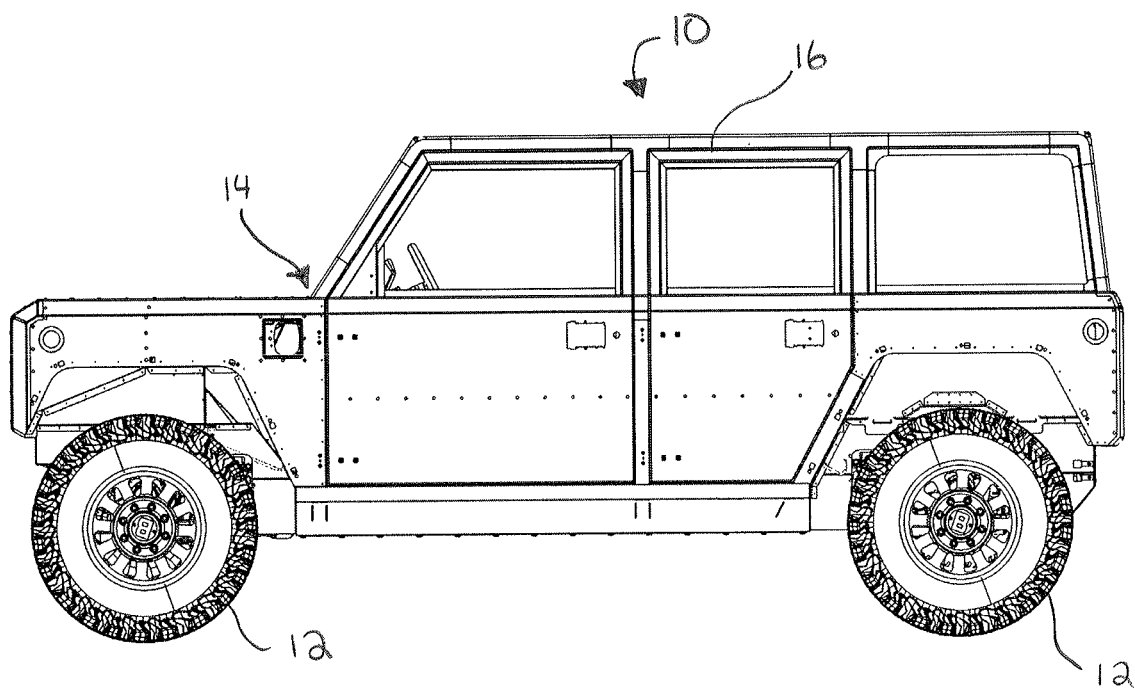
FIG. 1 illustrates a side view of the electric automotive vehicle having a full cab.

Reference will now be made in detail to exemplary embodiments of the present invention, examples of which are illustrated in the accompanying drawings. It is to be understood that other embodiments may be utilized, and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

An electric automotive vehicle 10 is presented, as shown in FIGS. 1-11. The automotive vehicle 10 may include standard structural components of a typical automotive vehicle, including a plurality of wheels 12, a chassis, and a body 14. The body of the vehicle may generally include a cab 16. In some embodiments, the vehicle 10 may further include a bed 17 positioned rearward or behind the cab.

Figure 2:
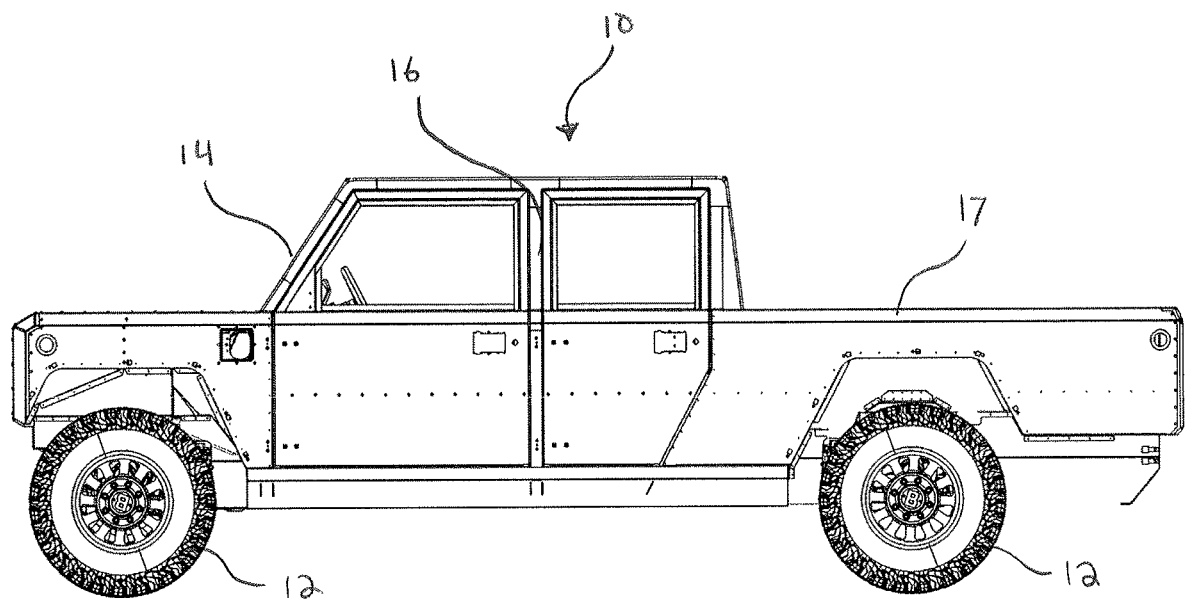
FIG. 2 illustrates a side view of the electric automotive vehicle having a cab and a rear bed.
Figure 3:
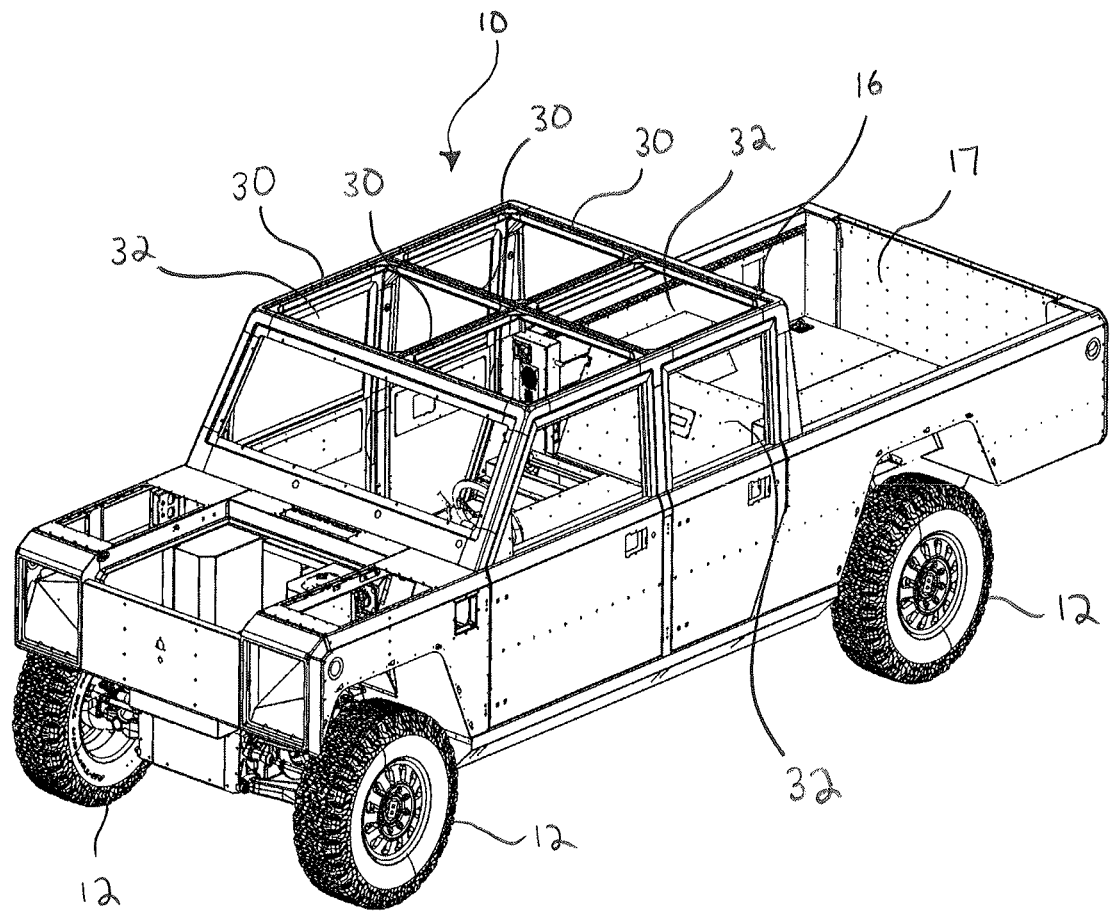
FIG. 3 illustrates a front perspective view of the electric automotive vehicle having a cab and rear bed and comprising a plurality of configurable support members.
Figure 4:
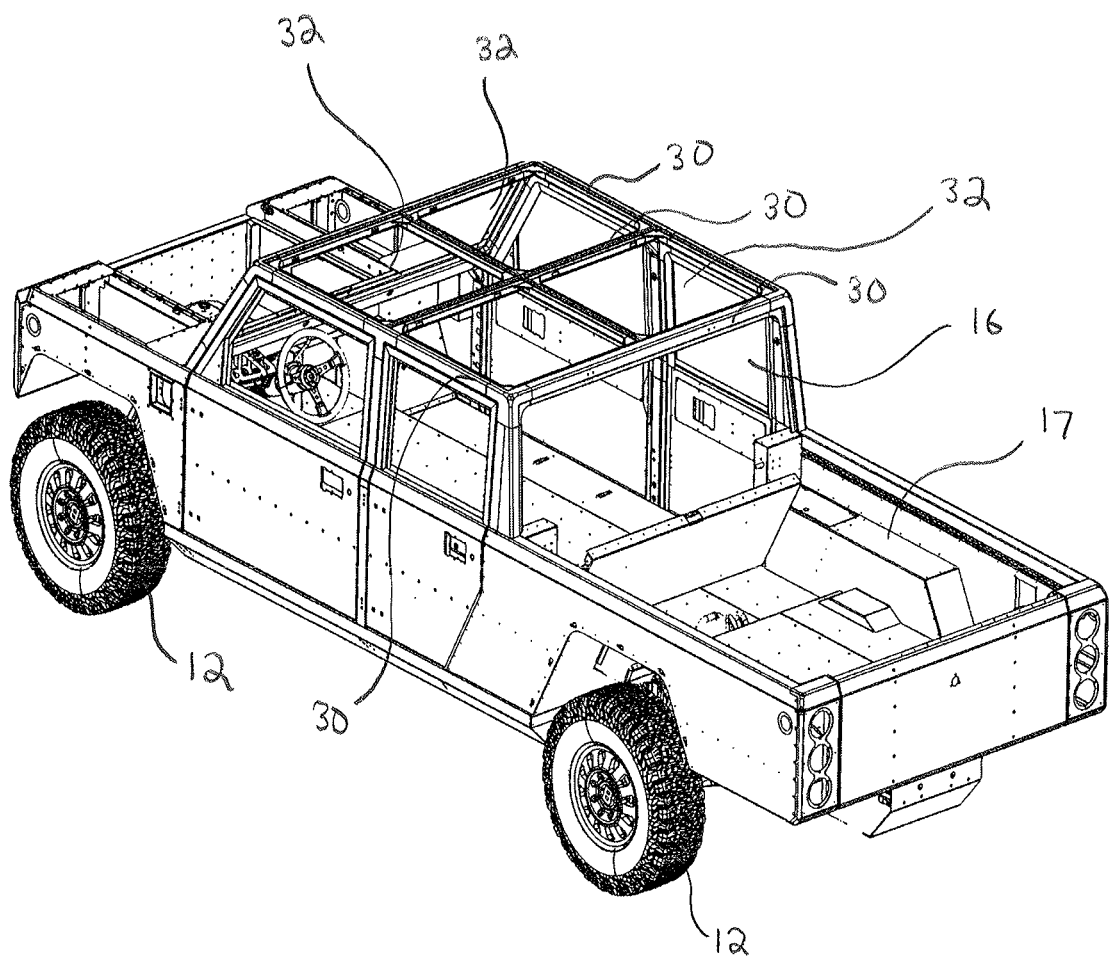
FIG. 4 illustrates a rear perspective view of the electric automotive vehicle having a cab and rear bed and comprising a plurality of configurable support members.

With reference to FIGS. 1-4, two embodiments of a vehicle body 14 are shown. The body 14 may comprise a full cab 16 and front hood, as illustrated in FIG. 1, or may further include a bed 17 located behind the cab 16, as illustrated in FIGS. 2-4. In an embodiment, the cab 16, as shown in either FIG. 1 or 2, may be reconfigurable. For example, the frame or structure of the cab 16 may be comprised of various support members 30. The support members 30 may be connected together to form a frame of the vehicle and may be reconfigured to reshape or alter the cabin space. The support members 30 may be all similarly sized and shaped to be interchangeable, or groups of support members 30 may be interchangeable, to allow ease of adaptability for the cab 16. The support members may be connected together using any appropriate means, such as clamped together, bolted, bracketed, or the like. The support members 30 may form framed openings 32, such as shown in FIGS. 3 and 4. The framed openings 32 may be filled with glass or body panels to create walled, roofed, or windowed surfaces of the cab 16.

The vehicle 10 may be powered by a power source or powertrain 18 other than a standard combustion engine. In contrast to typical automotive vehicles that include a gasoline powered internal combustion engine, the automotive vehicle 10 may be powered by a powertrain 18 that uses a fuel source other than gasoline, such an electric or battery powered engine. For example, the powertrain 18 may include a plurality of batteries tied together to operate as one as provide a unified power source for electric motors.

Figure 5:
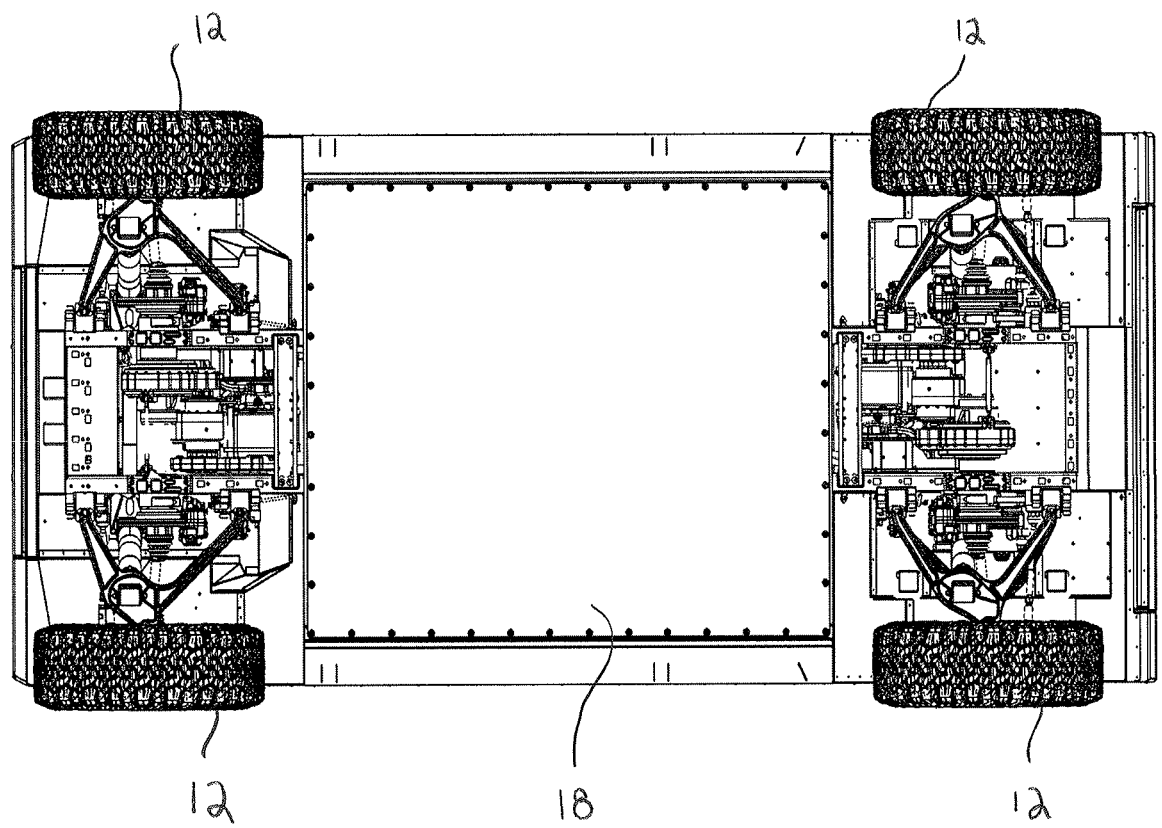
FIG. 5 illustrates a bottom view of a powertrain for an electric automotive vehicle.
Figure 6:
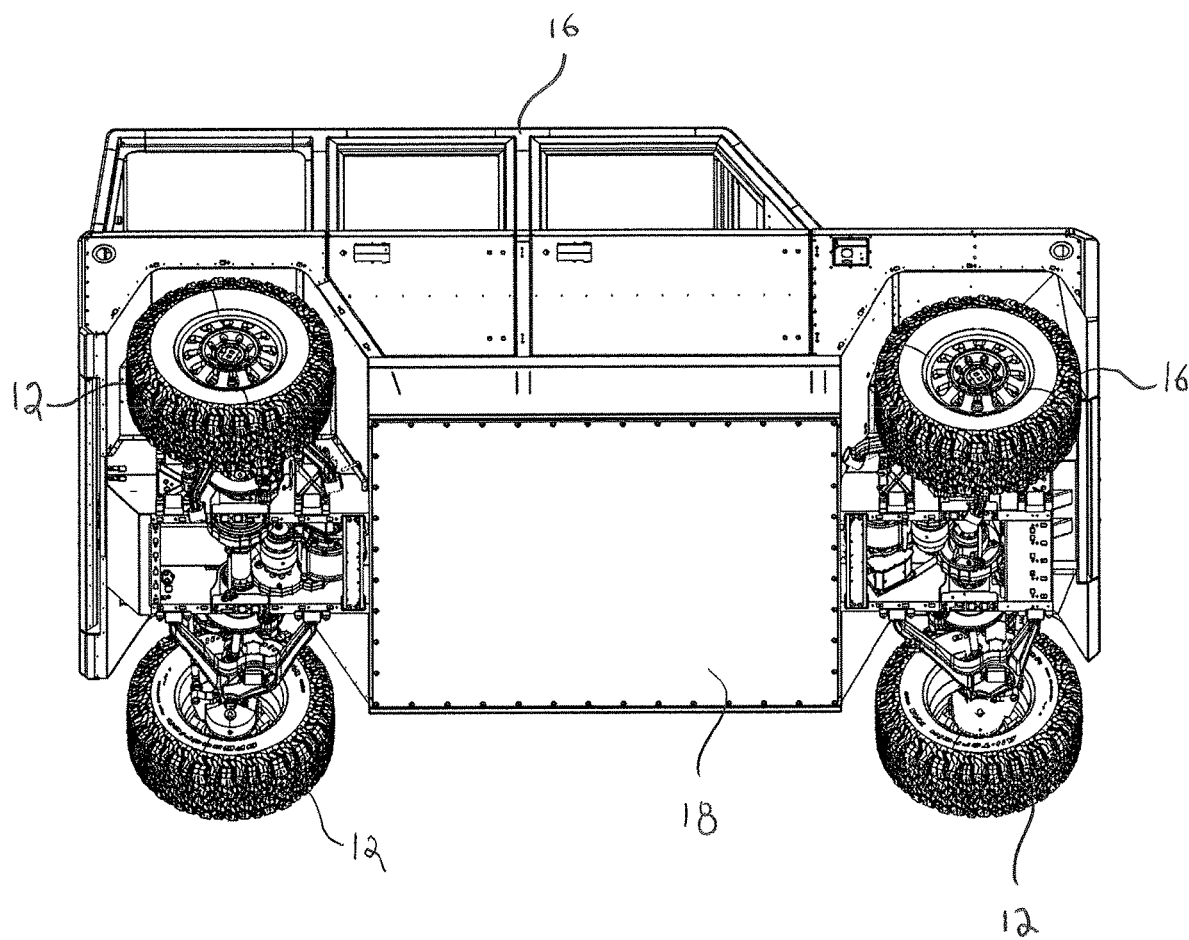
FIG. 6 illustrates a bottom perspective view of a powertrain for an electric automotive vehicle.
Figure 7:
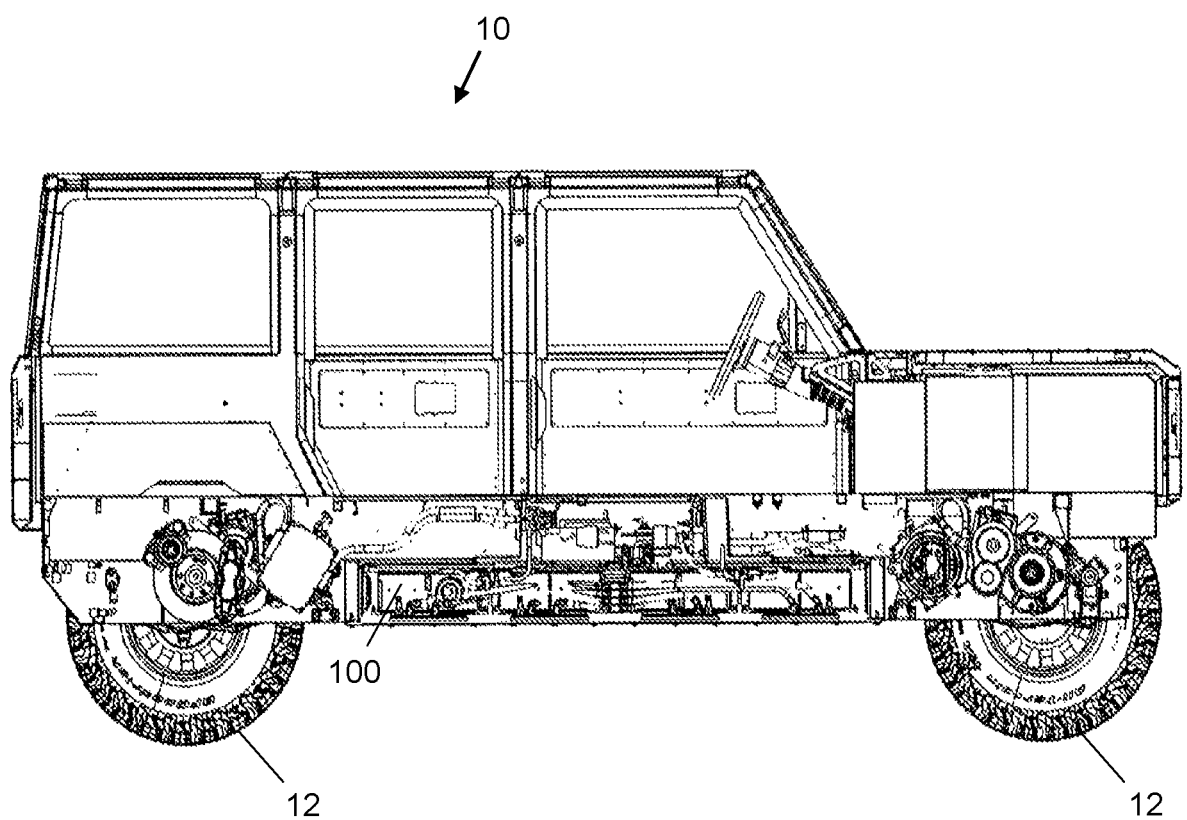
FIG. 7 illustrates a cutaway side view of an electric automotive vehicle.
Figure 8:
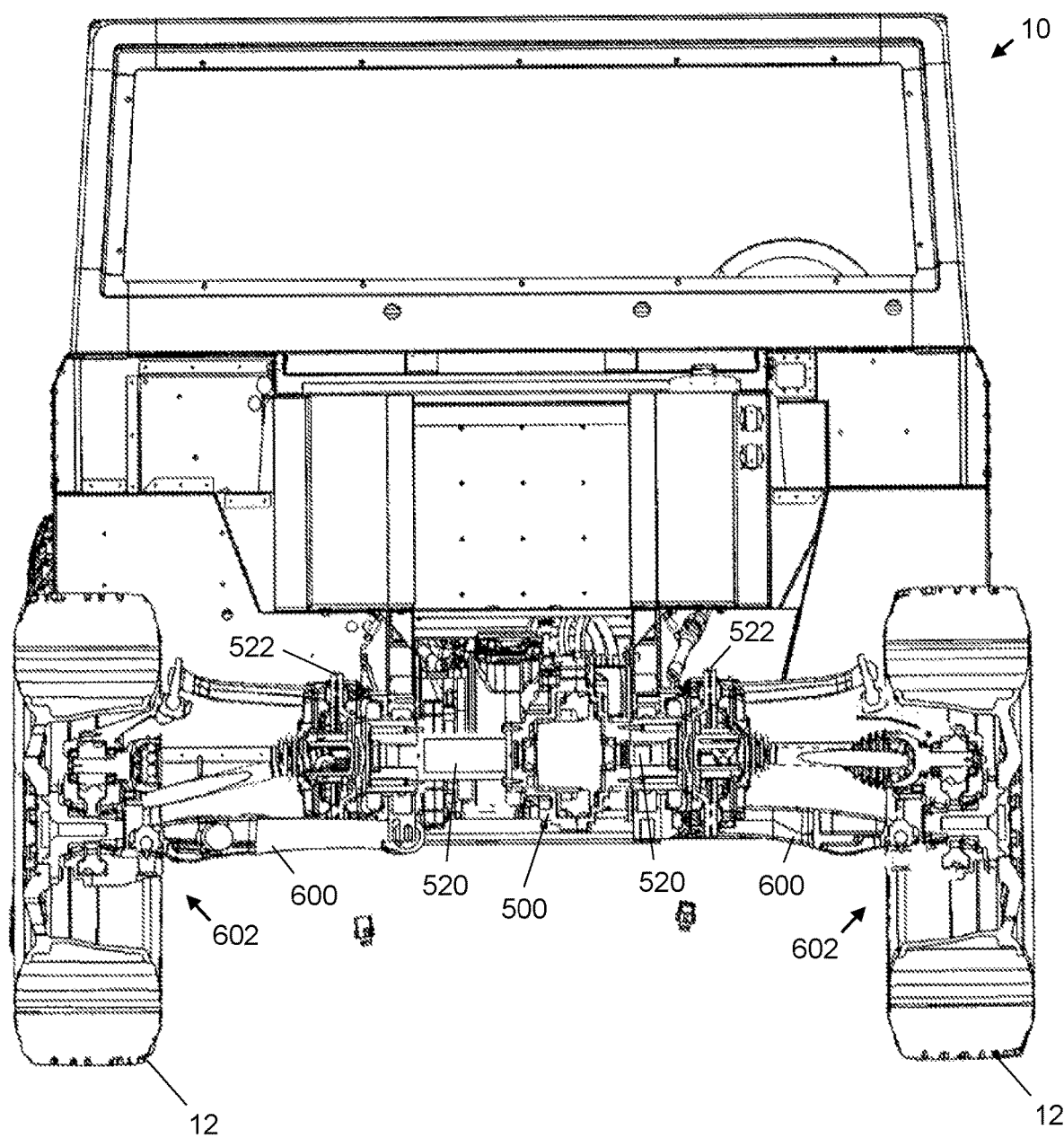
FIG. 8 illustrates a front cutaway view of an electric automotive vehicle.
Figure 9:
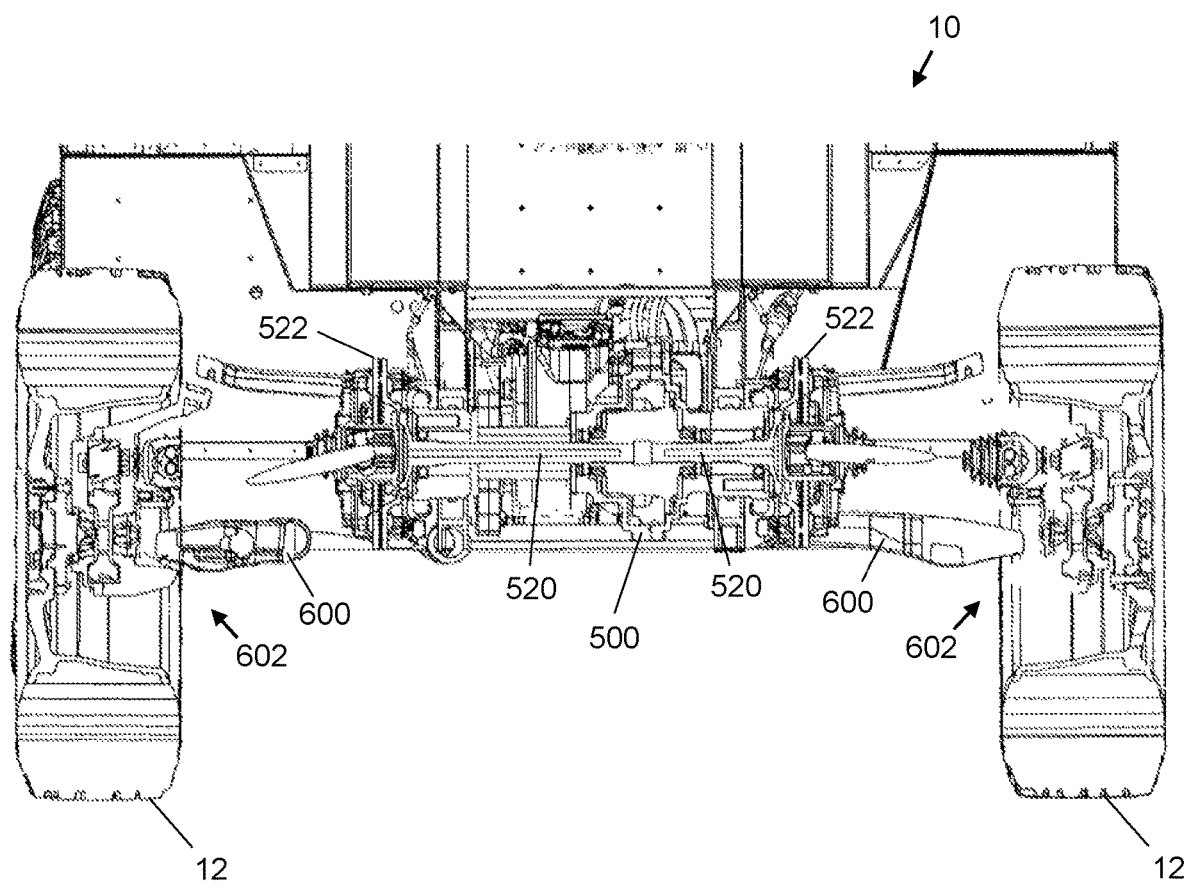
FIG. 9 illustrates a front cutaway view of the drivetrain of an electric automotive vehicle.
Figure 10:
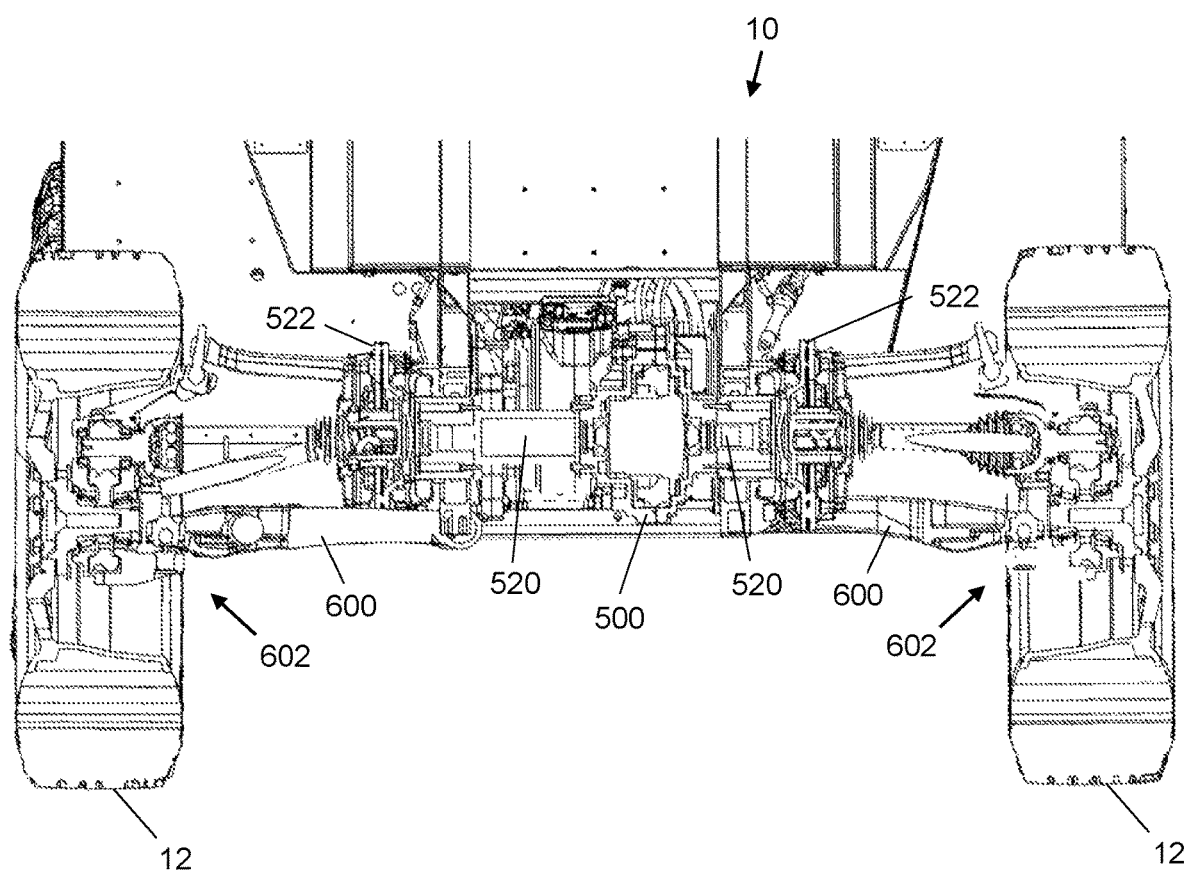
FIG. 10 illustrates a rear cutaway view of the drivetrain of an electric automotive vehicle.
Figure 11:
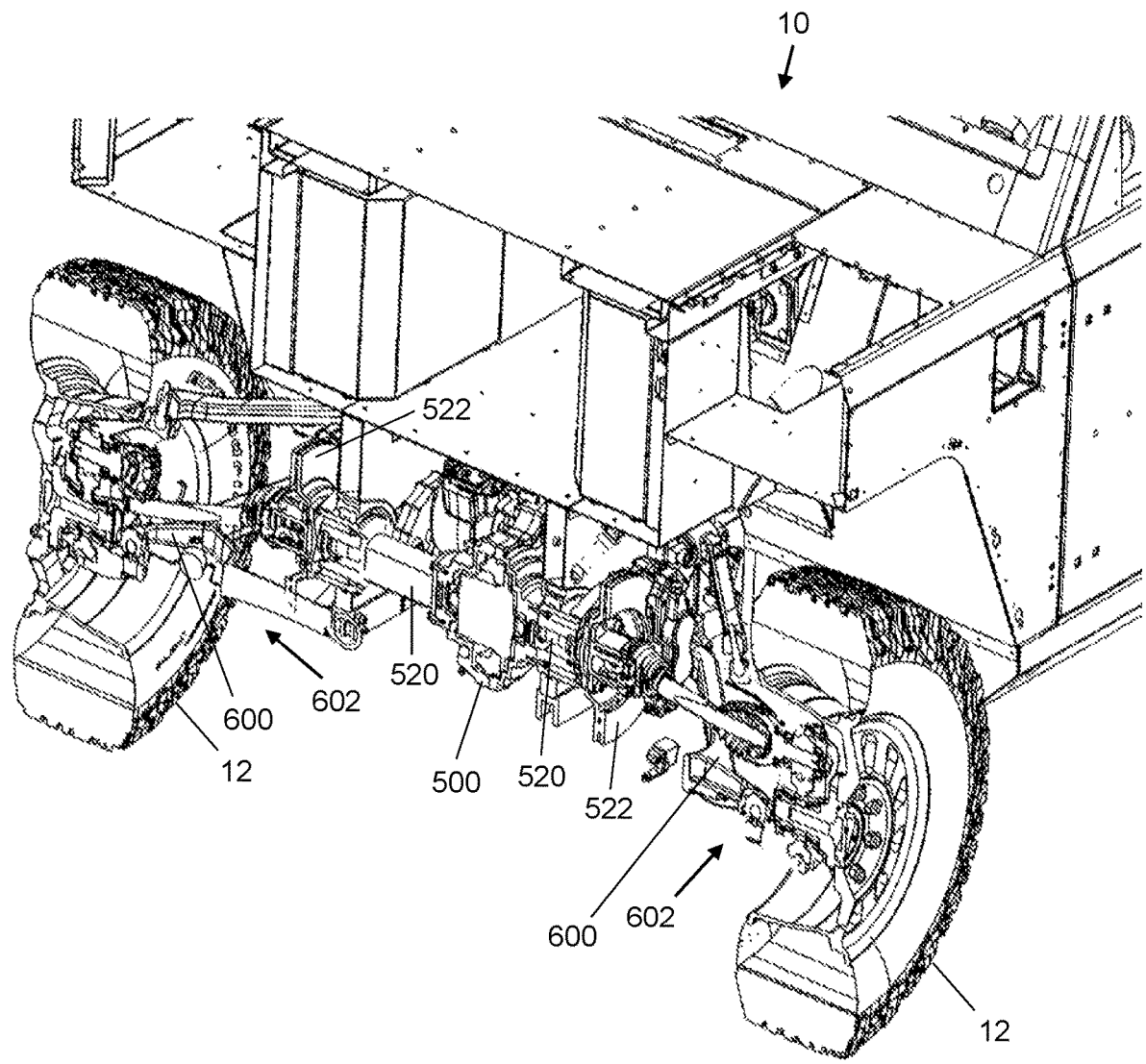
FIG. 11 illustrates a front perspective cutaway view of the drivetrain of an electric automotive vehicle.
Figure 12:
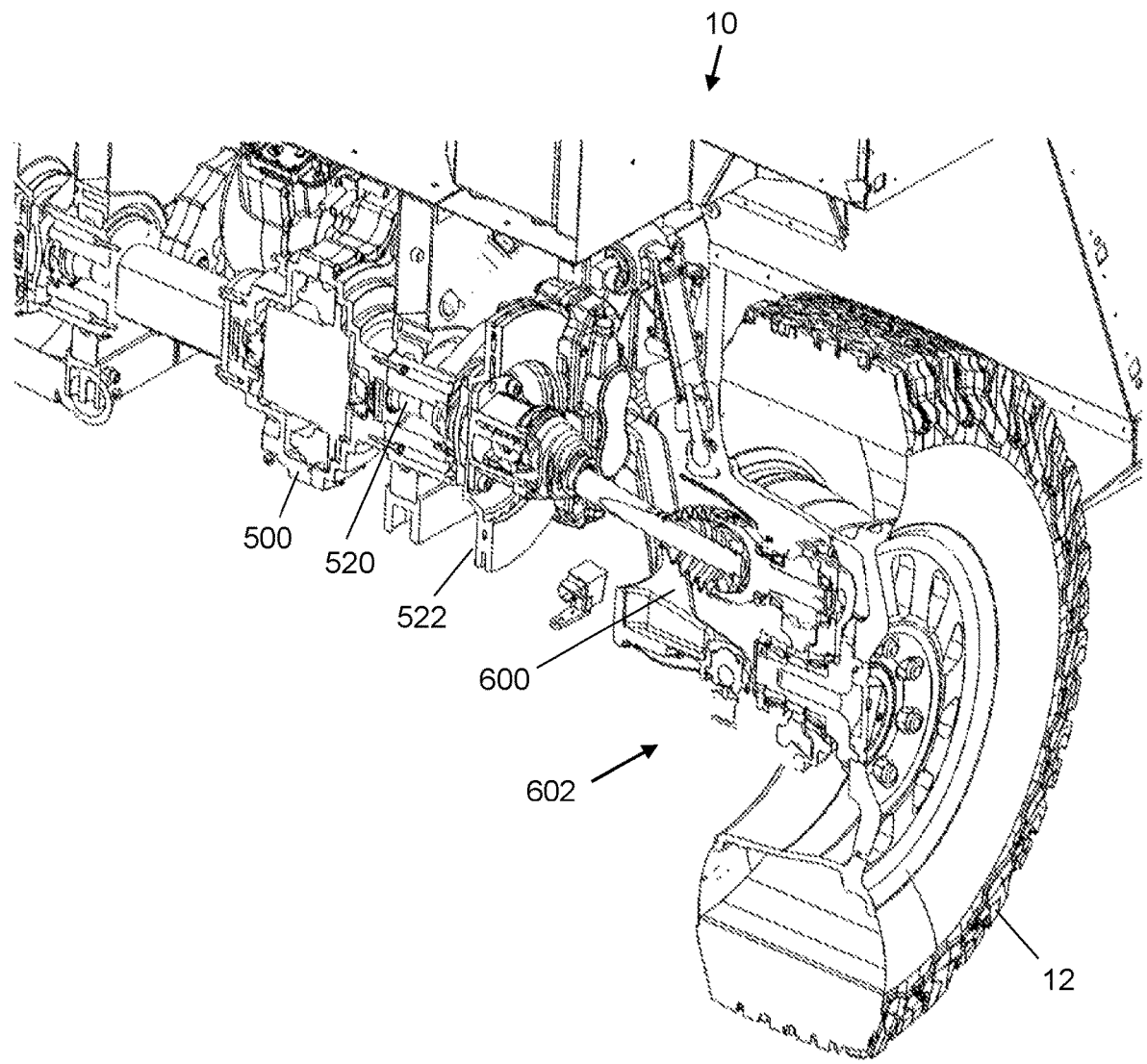
FIG. 12 illustrates a rear perspective cutaway view of the drivetrain of an electric automotive vehicle.
Figure 13:
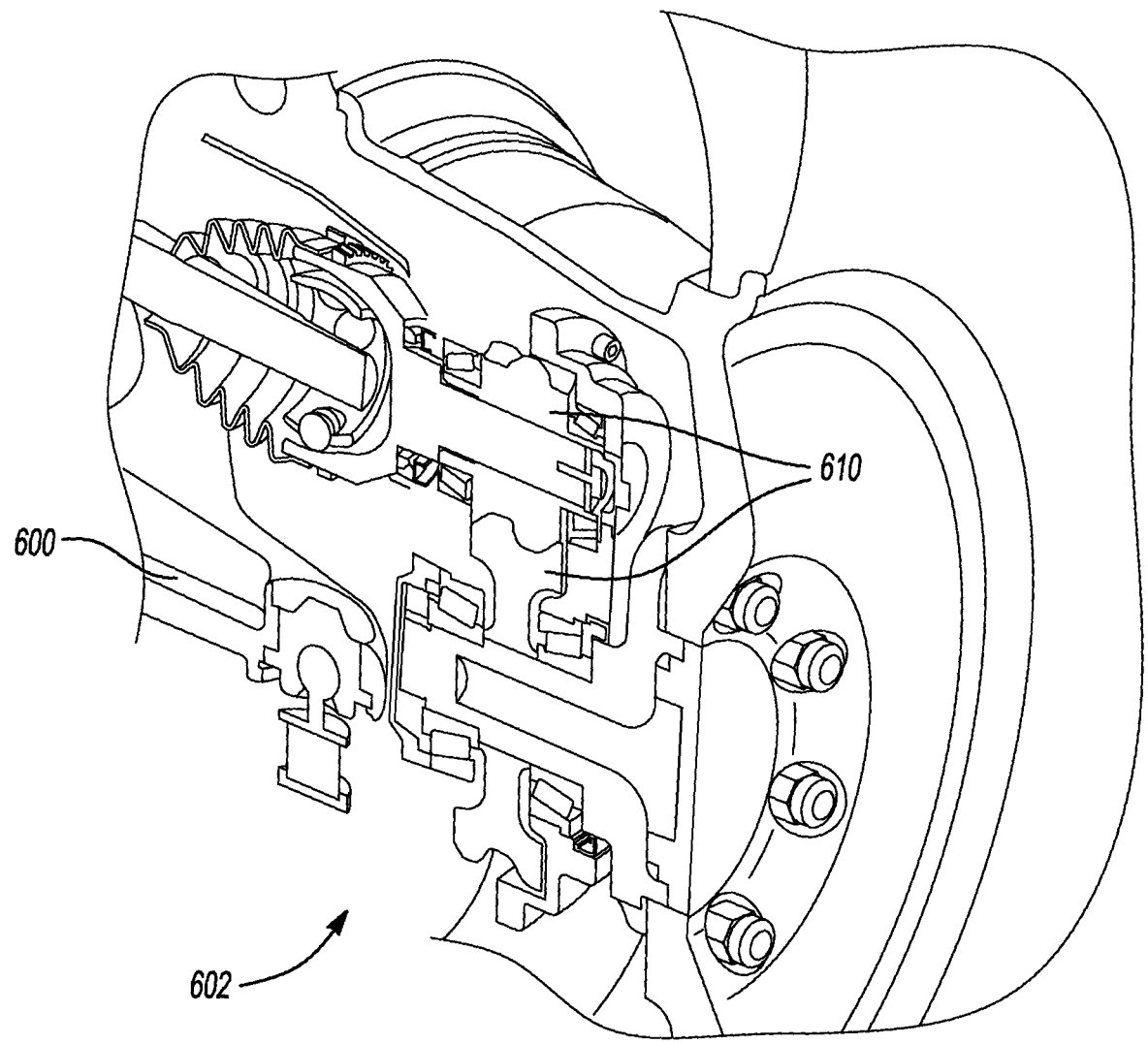
FIG. 13 illustrates a cutaway view of a wheel hub assembly.

In an embodiment illustrated in FIGS. 5 and 6, the vehicle 10 may be designed to balance the powertrain 18 with respect to the geometry of the vehicle 10. For example, the powertrain 18 may be generally or approximately centered with respect to central axes of the vehicle. In one instance, the powertrain 18 may be centered with respect to an axis, such as a geometric axis, of the vehicle that runs from the front end to the back end of the vehicle 10. In another instance, the powertrain 18 may be centered with respect to a geometric or weight axis that runs from one side to another side of the vehicle 10. The centered powertrain 18 may yield a better balanced vehicle 10 and may assist with control and stabilization of the vehicle 10.

The powertrain 18 may further be positioned at or near the base of the vehicle 10. As illustrated in FIGS. 5 and 5, the base of the powertrain 18 may coincide with the base or underside of the vehicle 10 to thus seat the powertrain at the lowest possible point on the vehicle 10. All remaining components of the drivetrain and otherwise may then be positioned above and around the powertrain 18. This design lowers the center of gravity of the vehicle to be lower and thus provide better handling and reduce risk of rollover.

In an embodiment, the vehicle 10 may comprise an electric all-wheel drive vehicle having gross vehicle weight rating greater than 10,000 lbs. The design characteristics of the vehicle, including suspension, drivetrain, structure, and other characteristics set forth herein, may be configured to manage the vehicle load, provide off road capabilities, and maximize the life of the vehicle, as set forth in further detail below.

With reference to FIGS. 7-13, cutaway views of the vehicle 10 are provided to illustrate the drivetrain and suspension components of the vehicle 10. Various novel characteristics of these features are provided below, however it will be appreciated that any standard or known features of drivetrains, suspensions, and the like, commonly used with traditional internal combustion engine vehicles, may also be employed and used with the features shown and described herein.

In an embodiment, the vehicle 10 may include two identical or substantially similar electrical drive units. The electrical drive units may each be comprised of an electric motor and a two-speed gear box 500, as further described below. The electrical drive units may be configured to each independently control an axle of the vehicle 10, such as one drive unit for the front axle and one drive unit for the rear axle. It will be appreciated, however, that this concept may be scaled to allow additional electrical drive units to control additional axles of a vehicle 10, such as with a commercial trucking vehicle or the like.

The vehicle 10 may further include inboard mounted brake discs 522, as illustrated in FIGS. 8-13. The vehicle 10 may also include additional gearing or torque control devices, such as a gear reduction 610 or clutches, located and independently controlled at each axle or each wheel 12. The individual gearing or clutching at each axle or wheel 12 may allow for individual torque control at each wheel 12 on the vehicle 10. For example, the vehicle 10 may be configured to sense speed and/or torque feedback at each wheel 12. Based on the feedback, the vehicle controllers may adjust the torque to each wheel 12 by adjusting the gearing or clutching at each individual axle or wheel 12 and balance the torque as needed.

As described in further detail below, in various modes, the two electric drive units may be tied together, through operation and control of the vehicle controllers, to lock the speed and torque of the front and rear axles. Alternatively, in some modes, the vehicle controllers may allow for independent torque control at each axle and/or at each wheel.

Figure 14:
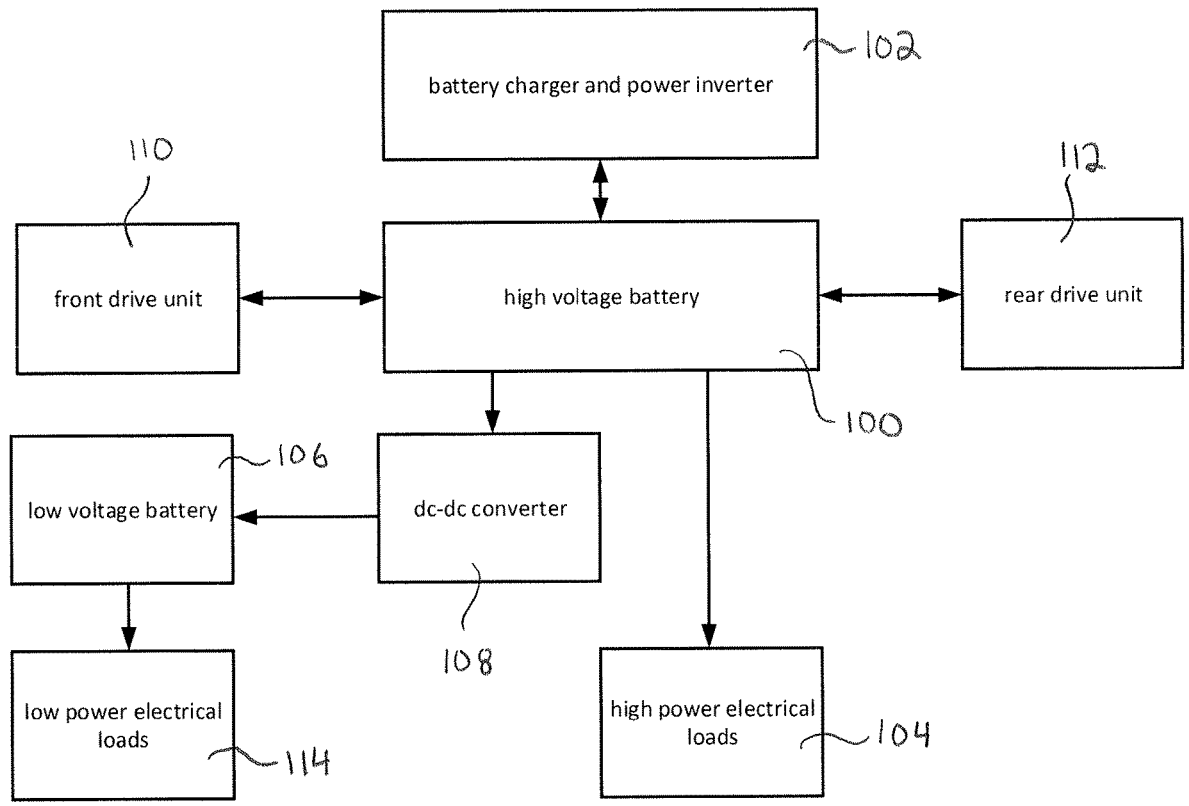
FIG. 14 illustrates an electrical power diagram for an electric automotive vehicle.

With reference to FIG. 14, an electric power block diagram is provided. As illustrated, the electrical power initiates at the high voltage battery 100 as shown in the center of the diagram. The battery 100 may be any appropriate high voltage battery. The battery 100 may comprise a plurality of cells or batteries coupled together to yield the desired high voltage. The battery 100 may be directly coupled to one or more drive units on the vehicle 10. For example, as shown, the vehicle 10 may comprise a front drive unit 110 and a separate rear drive unit 112. The high voltage battery 100 may connect directly to each drive unit 110, 112 to power respective electric motors, that each drive an axle of the vehicle. However, it will be further appreciated that the system may be scalable to add in additional drive units, such as to power additional axles on the vehicle 10 for commercial trucking uses and the like.

The battery 100 may be coupled to an on-board inverter charger 102. The inverter charger 102 may invert the DC voltage output from the battery 100 to create an AC voltage power signal for on board AC outlets. The inverter charger 102 may further allow for charging of the battery 100 when plugged into an appropriate power source. The high voltage battery 100 may further connect directly to any high power electrical components 104 on the vehicle, such as heater and air conditioning units.

The high voltage battery 100 may further provide power to low voltage components on the vehicle 10. As shown in the diagram, the battery 100 may power a low voltage battery 106, such as a 12 volt battery, through a dc-dc converter 108 to step down the voltage. The low voltage battery 106 may then power any low voltage DC loads 114 on the vehicle 10.

Figure 15:
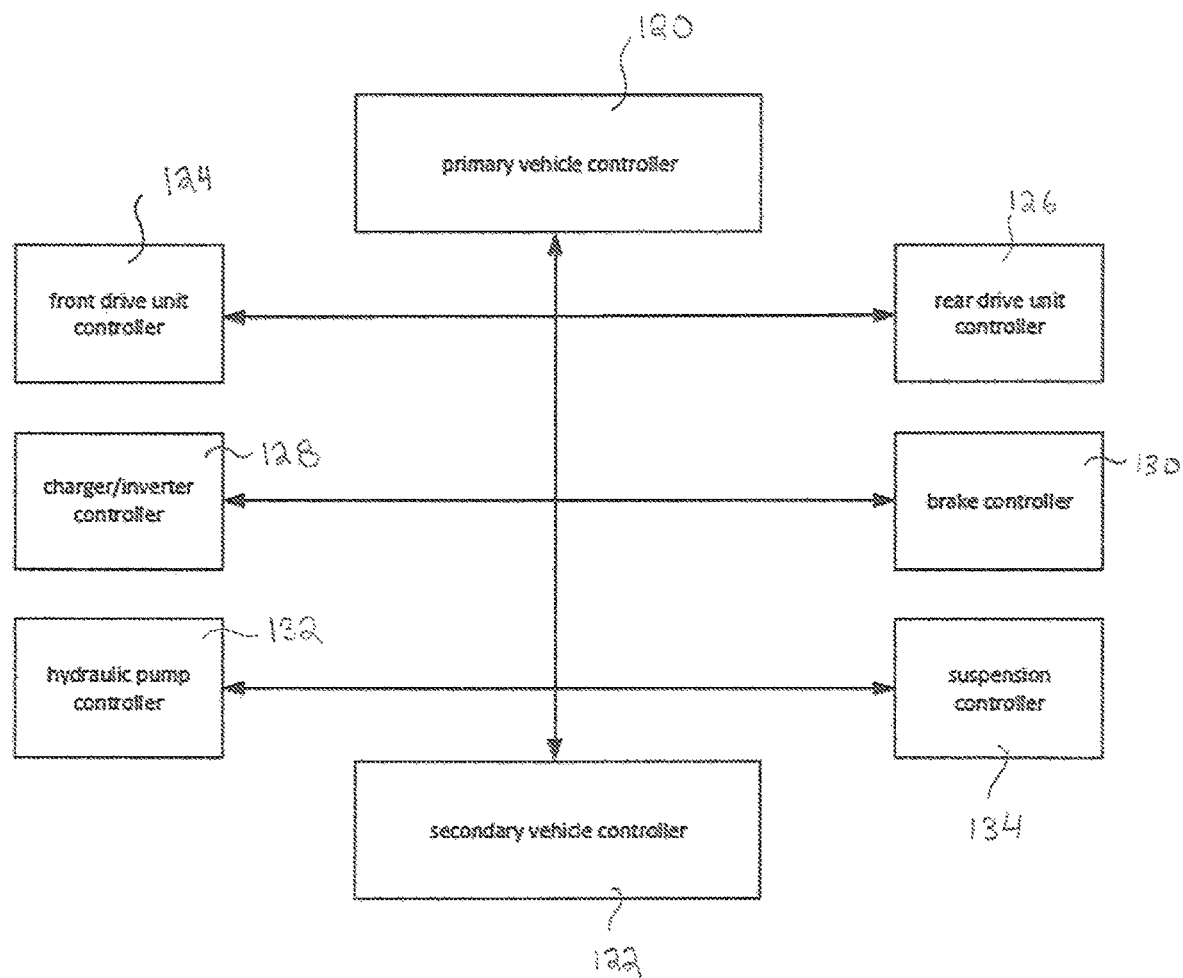
FIG. 15 illustrates a control block diagram for an electric automotive vehicle.

With reference to FIG. 15, a control block diagram is illustrated. The vehicle 10 may include two or more vehicle controllers, such as a primary vehicle controller 120 and a secondary vehicle controller 122. In an embodiment, the secondary vehicle controller 122 may function as a redundant controller to the primary vehicle controller 120 to provide additional layers of safety. The vehicle controllers 120, 122 may provide control over various systems on the vehicle, including the front and rear drive unit controllers 124, 126, the inverter charger controller 128, the brake controller 130, the hydraulic pump controller 132, and the suspension controller 134.

The vehicle controller 120 may be configured to function in two or more modes, such as an "on road" mode and an "off road" mode. The mode may be selectable by a driver or passenger of the vehicle 10 and may be selected using appropriate controls and inputs available to the passenger to send an input selection to the vehicle controller 120. In "on road" mode, the vehicle controller 120 may initiate a change in the gearing at each gearbox to put them in a high range mode, to decrease the gearing ratio, reduce torque and increase speed. The suspension may be configured to always return to a nominal height, differential locks may be disengaged, anti-roll protections may be engaged, and the front and rear drive controllers 124, 126 may be configured to allow for independent front and rear torque distribution to the wheels, or even independent torque distribution to each wheel. Further, the vehicle's ABS, traction control, and stability control systems may be active in "on road" mode.

In contrast, in "off road" mode, the vehicle controller 120 may initiate a change in the gearing at each gearbox to put them in a low range mode, to increase the gearing ratio, increase torque and reduce speed. The suspension may be configured to be ride height adjustable, differential locks and anti-roll protections may be selected and engaged as needed, and the front and rear drive controllers 124, 126 may be configured to fix an even 50/50 torque distribution between the front and rear axles. Further, the vehicle's ABS, traction control, and stability control systems may be selectable as needed in "off road" mode.

In an embodiment, the suspension controller 134 may be configured to adjust the height of the vehicle 10 using an on-board hydraulic pump to adjust the pressure to the hydraulic suspension. Adjustments to the suspension may be made individually at each wheel. The suspension controller 134 may read inputs including both pressure sensing at each wheel as well as wheel position to determine any appropriate height adjustment at each wheel.

Figure 16:
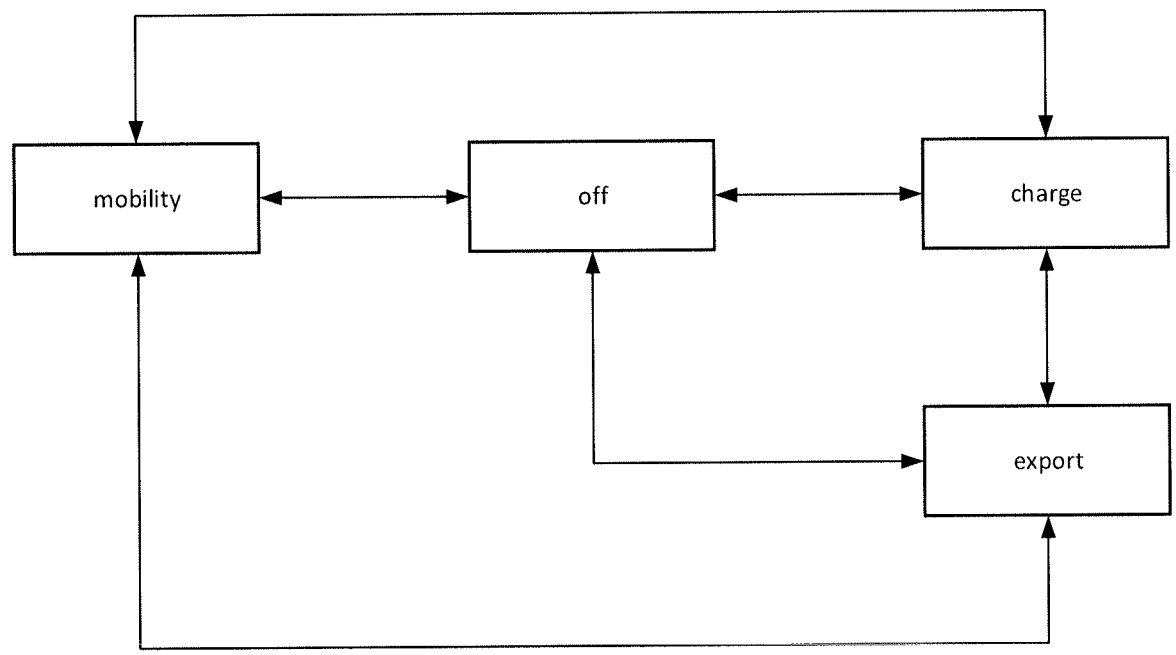
FIG. 16 illustrates a modes of operation diagram for an electric automotive vehicle.

With reference to FIG. 16, an operations mode diagram is provided. In off mode, all power and systems on the vehicle 10 may be disabled and turned off, including the battery. The vehicle 10 may then include various modes to power on various components and enable selected features and functions. For example, the vehicle 10 may be placed in charge mode. In charge mode, the battery may be active or awake and capable of receiving a charge from an appropriate power source. Charge mode may be activated manually or may be activated automatically when a charging device is sensed at the vehicle's charging port. The battery may be restricted from powering any auxiliary or system devices while in charge mode.

The vehicle may alternatively be placed into an export mode. The export mode may be manually selected, such as by activation of a switch located under the hood of the vehicle 10. Export mode may turn the battery on and allow for only the AC outlets on the vehicle to be powered. All other components, including drive components, low voltage and auxiliary components, may remain unpowered in export mode. Notably, both charge mode and export mode may be activated without use of the vehicle key.

When the key is inserted, the vehicle 10 may be turned on and placed in mobility mode. In mobility mode, the battery and all powered components may be activated and available for use, including the drive systems, high voltage AC outlets, and all auxiliary and low voltage components. The charge mode, export mode, and mobility mode may be mutually exclusive of one another such that the vehicle may only operate in one selected mode at a time.

In an embodiment, the vehicle 10 may be configured to provide independent torque control to each axle. As described herein, the vehicle 10 may include a plurality of electric drives, such as a first electric drive 110 connected to and configured to drive a first axle, such as through a gearbox, and a second drive 112 connected to and configured to drive a second axle, such as through a second gearbox. The first and second electric drives 110, 112 may both be powered by a common battery pack 100.

Figure 17:
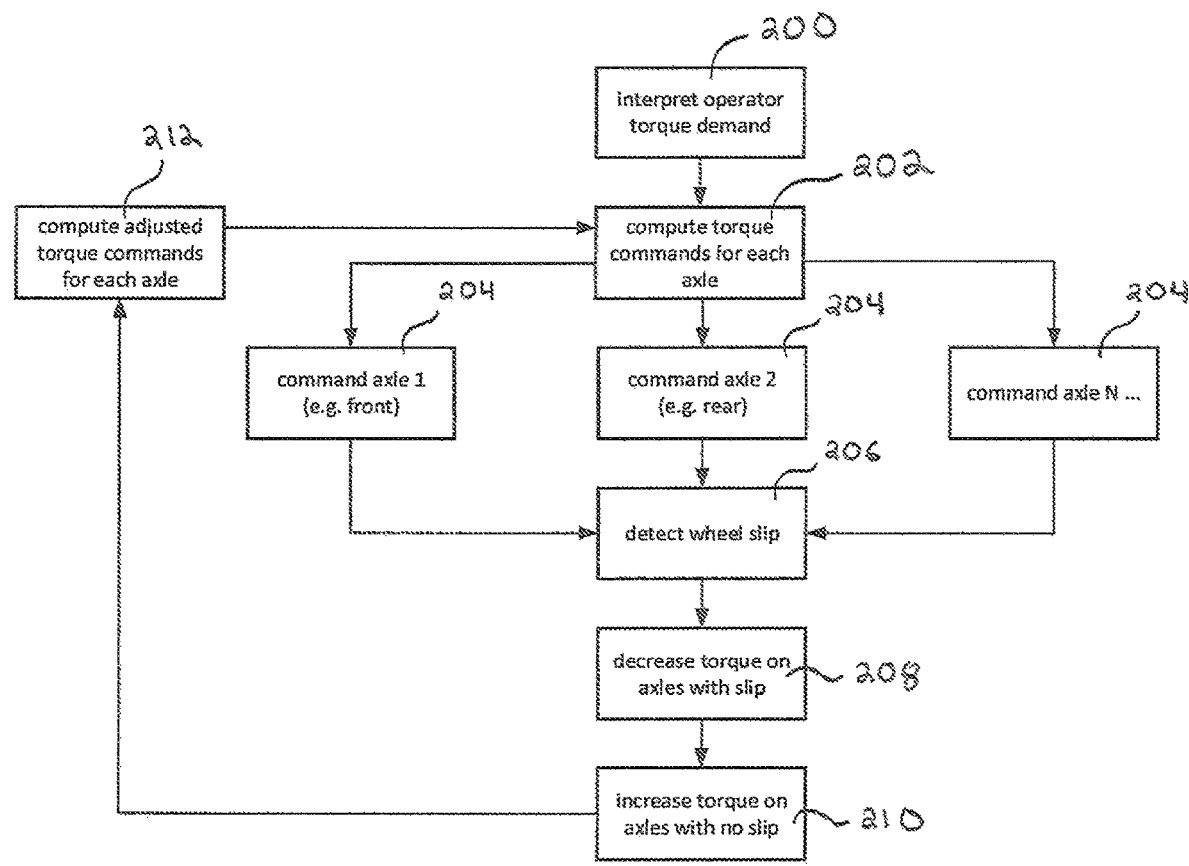
FIG. 17 illustrates a flow chart for a torque control strategy.

As illustrated in FIG. 17, the vehicle 10 may be configured to adjust the torque output of each of the drives 110, 112 in response to slip detection. Specifically, the vehicle 10 may include slip detection sensors at each wheel, or at each axle. The slip detection sensors may sense a slip condition, including the amount of slip, at each wheel, and provide the slip detection feedback to the primary vehicle controller.

The vehicle 10 may be configured to equally distribute power to the front and rear drives 110, 112. For example, the primary vehicle controller 120 may equally demand power from the front and rear drives 110, 112 so that each drive may utilize 50% (or less than 50%) of the total available battery power. If a slip condition is sensed at the front or rear axle, the primary vehicle control unit 120 may adjust the output of the front and rear drives 110, 112 to account for the loss of traction. For example, if the front and rear drives 110, 112 are each operating at 30% (utilizing a total of 60% of the available power of the battery) and a slip condition is detected at the right front wheel, the primary vehicle control unit 120 may adjust the power that is sent to the drives 110, 112 by reducing the power sent to the slipping axle and increasing the power sent to the non-slipping axle. For example, the drive control units 124, 126 may increase the total power to the rear axle to 40% while reducing the total power to the front axle to 20%. The increase in power to the rear drive 112 may increase the torque at the rear wheels and assist in moving the vehicle forward, while the decrease in power to the front drive 110 may reduce the torque and the front wheels and thus reduce the slipping.

The torque control process may attempt to maintain tractive power at a given level requested by the operator. In the example provided above, where a slip condition is detected when the front and rear drives 110, 112 are utilizing a total of 60% of the power of the battery 100, the torque control system may attempt to maintain the total power usage at 60% while redistributing that power between the front and rear drives 110, 112 to reduce slipping but maintain speed.

FIG. 17 provides a logic flow chart for the torque control process. At an initial step, the system may interpret the operator torque demand 200. For example, the torque demand may be received by the system by receiving an input from the accelerate pedal, such as the percentage of throttle that is input by the user, via the pedal. The system may then compute the torque demands for each axle 202 based on the operator torque demand. For example, the system may receive the accelerate pedal input and compute the percentage of torque to be applied at each axle 204. In an embodiment, the vehicle may include more than two axles, in which case the torque may be calculated for each axle 204.

Once the torque is determined based on the operator torque demand, the vehicle 10 may monitor the wheels for any slip 206. When a slip is detected, the front and rear drive control units 124, 126 may decrease torque on the axles with slip 208 and increase the torque on axles with no slip 210. Based on the slip calculations, the vehicle may then compute the adjusted torque commands for each axle 212, and then continue to monitor the slip of the wheels.

Figure 18:
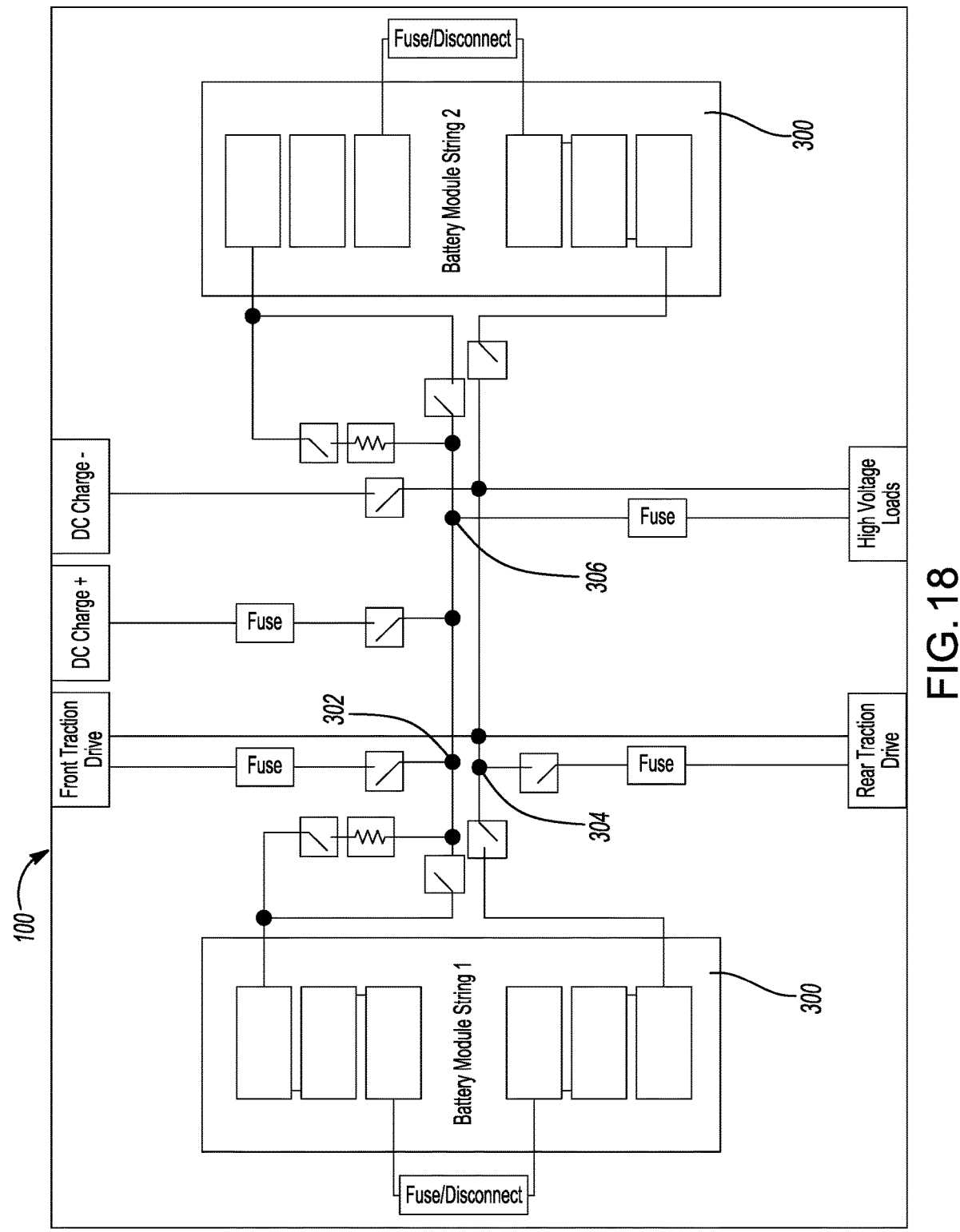
FIG. 18 illustrates a system diagram of a battery pack.

In an embodiment, the battery 100 may be configured to provide improved connection options with the front and rear drives 110, 112 and other components of the vehicle 10. With reference to FIG. 18, the battery may include a plurality of module strings 300. The module strings 300 may be connected together, such as in parallel, to form the battery pack 100. Further, the vehicle controller 120 may monitor power flow characteristics, such as voltage and current, as well as temperature at one or more locations in each parallel string 300. If desired, the vehicle controller 120 may manage cooling flow to each string 300 independently, based on temperature variations at each string 300. The vehicle controller 120 may also selectively enable or disable one or more parallel strings 300 to maintain safety, provide continued vehicle operation at degraded levels of performance in the event of a fault contained within one or more strings, or improve overall system performance and life expectancy. A fault condition may comprise an over-voltage or under-voltage condition, an over-current or under-current condition, an over-temperature condition, or any power flow or temperature measurement outside of predetermined thresholds or having too great of a measurement differential from nearby battery modules or other strings 300.

The battery 100 may include a plurality of power connections, each specifically located and spaced to provided connection points near points of use. For example, the battery 100 may include a front facing power connection 302 and a rear facing power connection 304. The front and rear power connections 302, 304 may be located near the respective front and rear drives. The positioning of the power connections 302, 304 may reduce the need for cabling and provide an ease of connection between the battery 100 and the front and rear drives 110, 112. The battery 100 may additionally include a connection for high voltage auxiliary loads In an embodiment illustrated in FIGS. 19-26, the battery 100 may comprise a series of modules 400 that are arranged in strings 402 and stacked together. The modules 400 may be connected to or supported by a structural support member 404. The support member 404 may comprise an I-beam or I-beam shaped component. For example, the support member 404 may include a central beam 406 and top and bottom plates 408, 410 extending perpendicular to the central beam 406 from the top and bottom of the central beam respectively. The I-beam support members 404 may be symmetrical in shape to allow the battery modules 400 to be connected to and arranged along either side of the central beam 406, between the top and bottom plates 408, 410. The support members 404 may further be formed through and extrusion process, such as aluminum extruded I-beams. The support members 404 may be arranged laterally or vertically with respect to the vehicle frame. The strings 402 may be connected together and surrounded by a battery casing. The battery casing may then be connected to the vehicle frame. The rigidity of the support members 404 may provide resistance against twisting and torqueing forces, and other forces, applied against the frame and may increase the frame's stiffness and rigidity.

Figure 20:
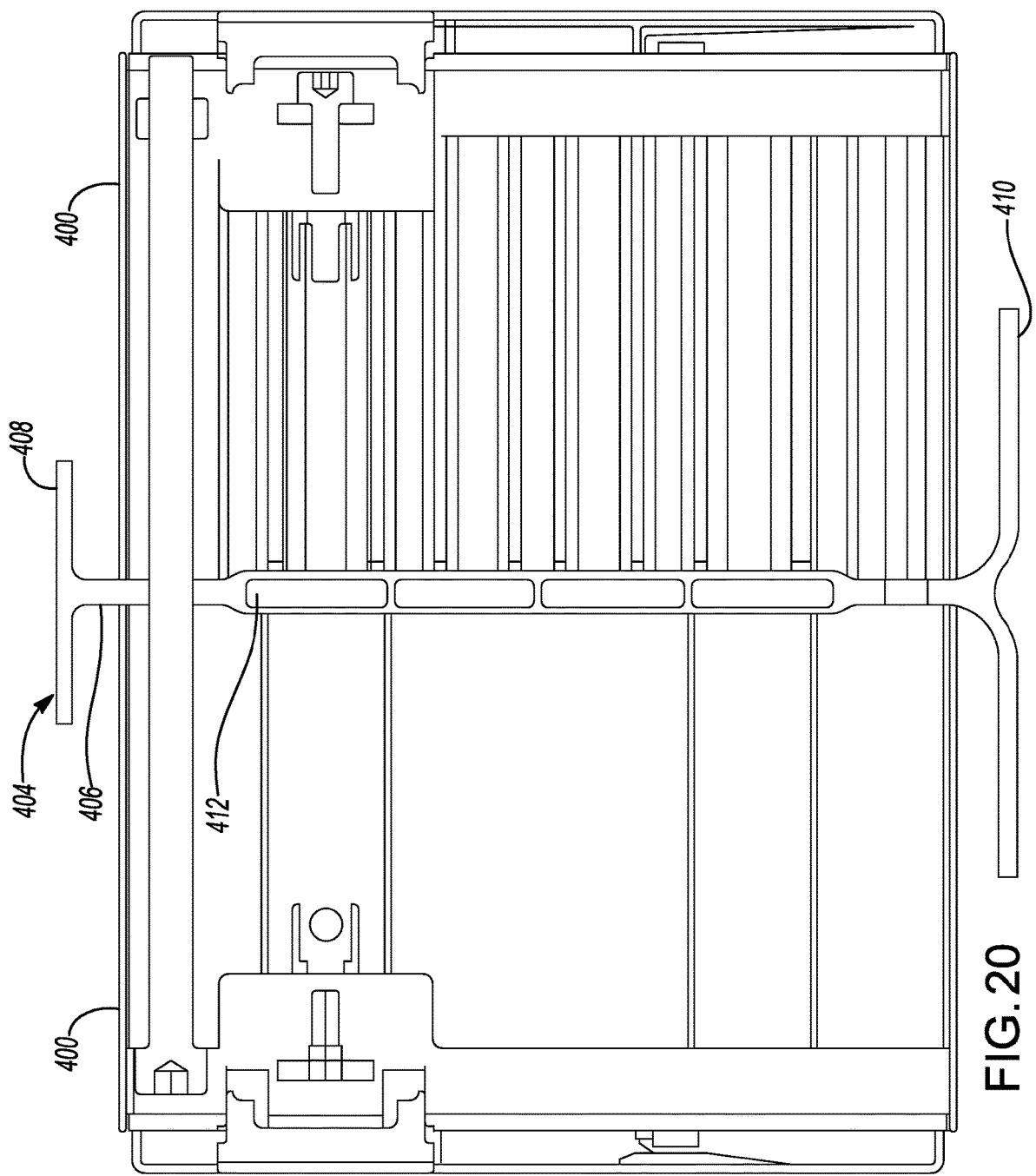
FIG. 20 illustrates a cutaway view of two battery modules connected to a support member.
Figure 21A:
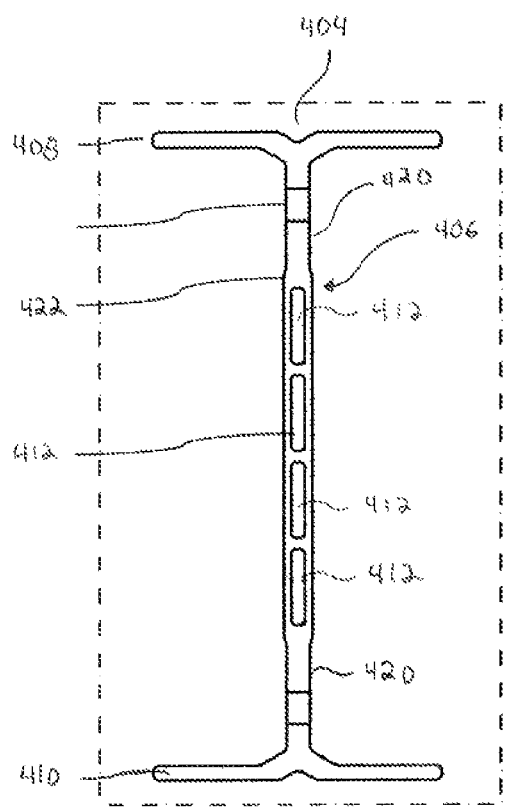
FIG. 21a illustrates a cross-sectional view of a support member with a cooling channel.
Figure 21B:
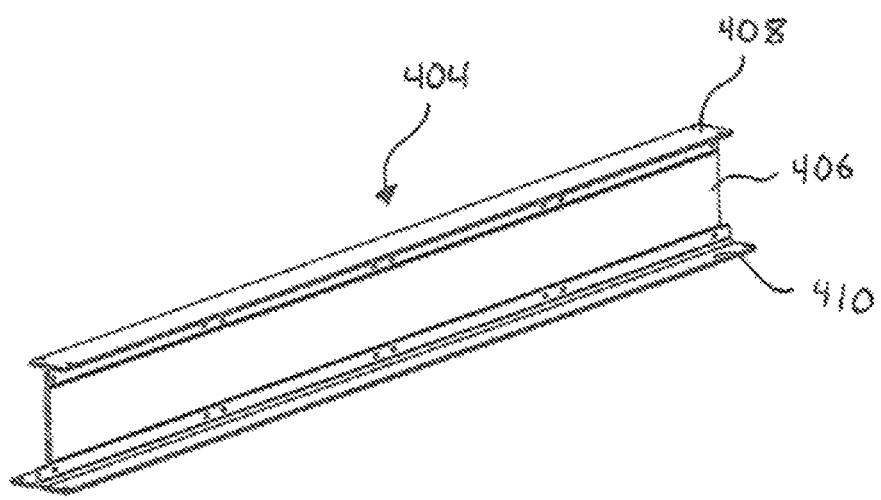
FIG. 21b illustrates a perspective view of a support member.

The support member 404 may include a fluid channel 412 positioned in the central beam 406. The fluid channel 412 may extend along the length of the central beam 406 and include a cooling fluid therein. The fluid channel 412 may be divided into portions, such as four channel portions sectioned off form one another, as shown in FIGS. 20 and 21. The cooling fluid may be pumped or moved through the channel 412 to cool the battery modules 400 that are positioned adjacent to the central beam 406.

Figure 22:
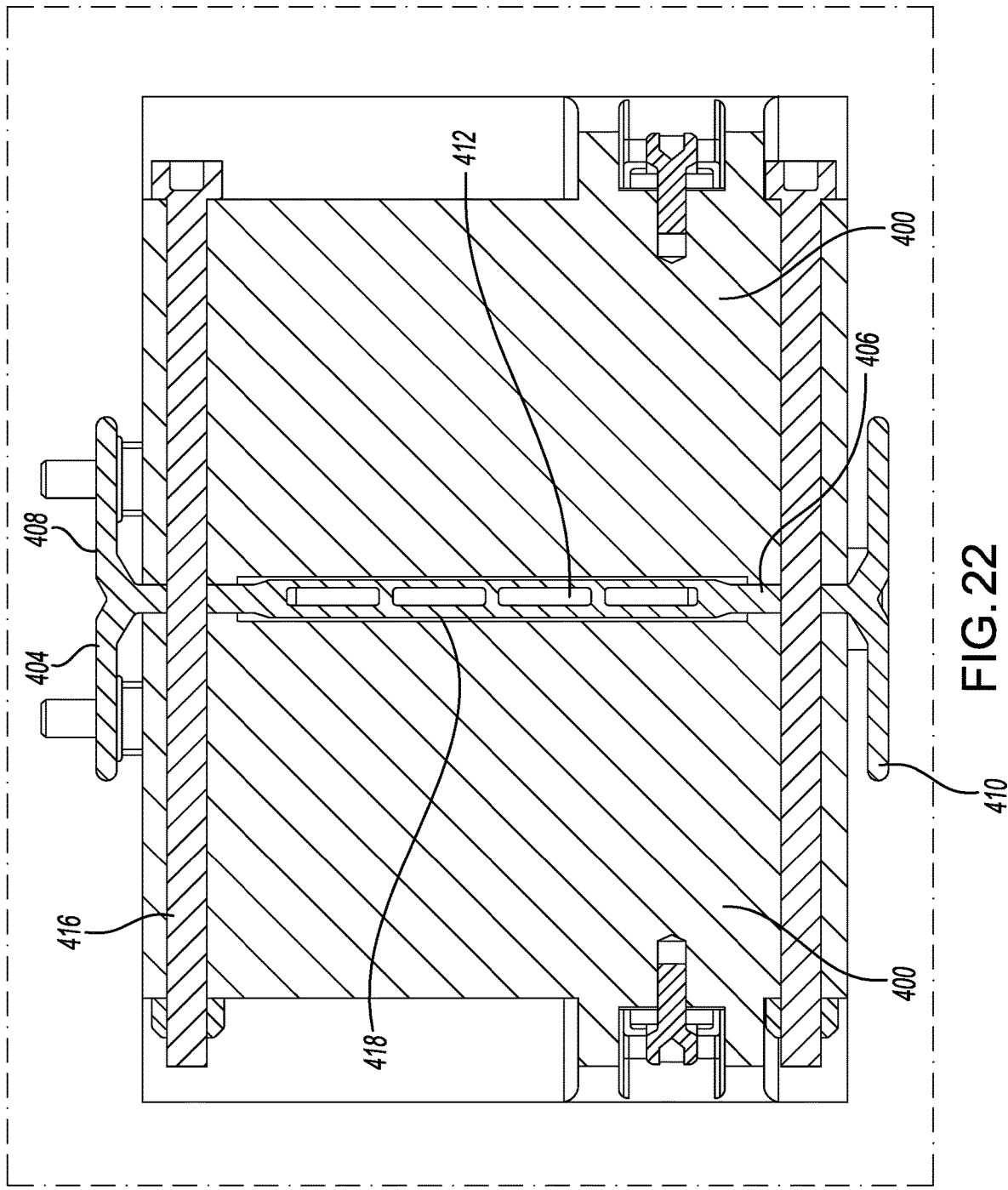
FIG. 22 illustrates a cutaway view of a support member with battery modules connected on both sides of the central beam.

The support member 404 may further include one or more mounting holes 414. The mounting holes 414 may extend through the central beam 406 and may be configured to receive a bolt 416 therethrough. The battery modules 400 may be bolted to the support member 404, such as bolted to or through multiple mounting holes 414 in the central beam 406. For example, as illustrated in FIG. 22, battery modules 400 may be positioned on each side of the central beam 406 and bolts 416 may be inserted through one or more opening holes in the battery casing that align with the mounting holes 414. The bolts 416 may extend from an exterior of one battery module 400, through a mounting hole 414, and through an opening in a second battery module 400. The bolt 416 may be fixed to the battery by a nut or other connecting element. As shown in FIG. 22, the battery modules may be mounted to the support member 404 via a top bolt 416 and a bottom bolt 416. However, it will be appreciated that any number of bolts 416, corresponding to similar mounting holes 414, may be used.

The support member 404 may include a thermal interface 418 positioned between the battery module 404 and the central beam 406. The thermal interface 418 may be generally configured to provide enhanced thermal conductivity between the support member 404 and the battery module 400. The thermal interface 418 may comprise a compressible material that is dispensable in liquid form and cures or solidifies over time to conform to the shape and structure of the bottom of the battery module 400. The battery module 400 may include a designated surface that is engineered for heat transfer, commonly referred to as a cold plate. The battery module 400 may be mounted with the cold plate facing and abutting the thermal interface 18 to allow for optimal heat transfer between the battery module 400 and the central beam 406.

In an embodiment, the central beam 406 may be formed or extruded with a varied thickness. For example, as shown in FIG. 21a, the central beam 406 may include first sections 420 having a first thickness near the top and bottom plates 408, 410 and may include a second section 422, between the first sections 420, having a second thickness. In particular, the second section 422 may be thicker than the first sections 420 and the central beam 406 may include a step where the thickness varies between the sections. The thicker second section 422 may include the fluid channels 412 and the increased thickness may assist in creating contact with the cold plate of the battery modules 400 and reducing the amount of thermal interface 418 needed to create good contact with the battery modules 400.

The temperature of the battery modules 400 may be monitored, such as by one or more temperature sensors. The temperature sensors may be positioned on the battery modules or embedded in the battery modules. Temperature data from the sensors may be sent to an intermediate controller, such as a master battery pack BMS, or directly to the primary vehicle controller. The temperature data may be used to determine appropriate outputs that may be then used to cool the battery system. For example, when a battery module reaches a predetermined temperature threshold, the system may turn on a heat exchange or radiator to cool the cooling fluid and may pump the cooled fluid through the fluid channel 406. It will be appreciated that the system may similarly be used to warm the batteries, such as by pumping heated fluid through the fluid channel 406 to bring the batteries up to a predetermined temperature.

In an embodiment, the temperature control system may be configured to regulate fluid control individually through each support member 406. For example, if a temperature above or below a preset threshold is sensed at any single battery module 400 on a string 404, the appropriate valves and pumps may be engaged to circulate heated or cooled fluid within the string 404 to regulate the temperature of the target battery module 400.

Figure 23:
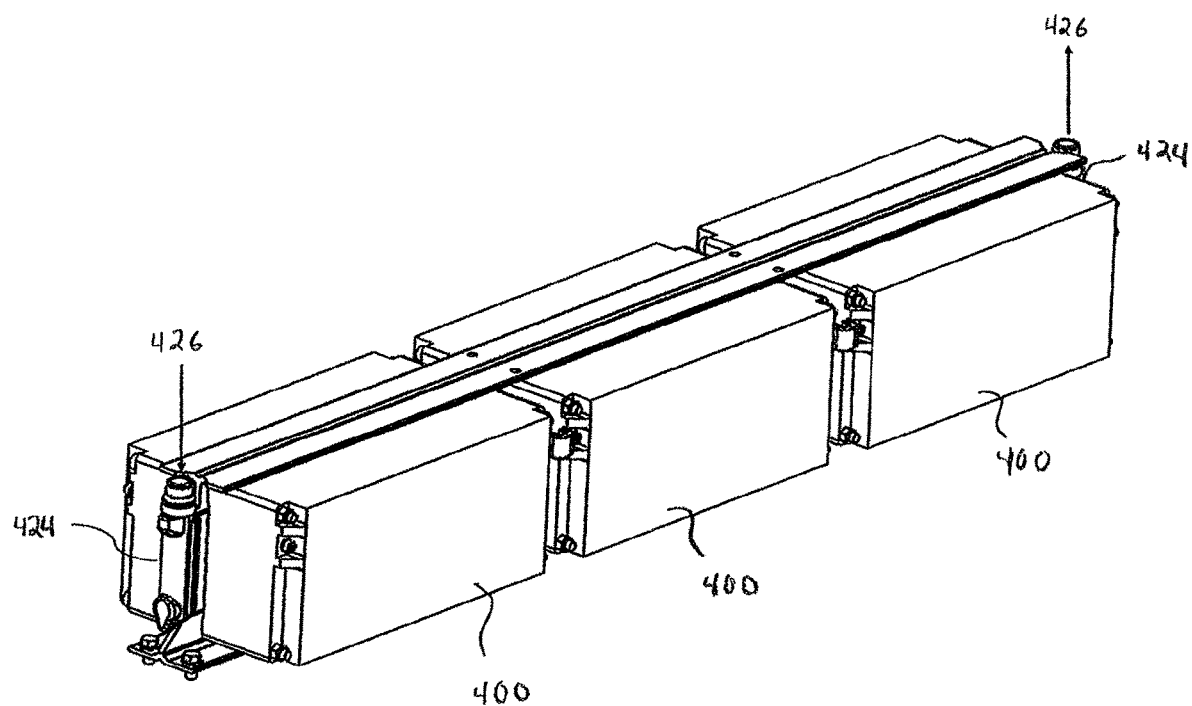
FIG. 23 illustrates a battery module string on a support member having a fluid tank connected at its end.
Figure 24:
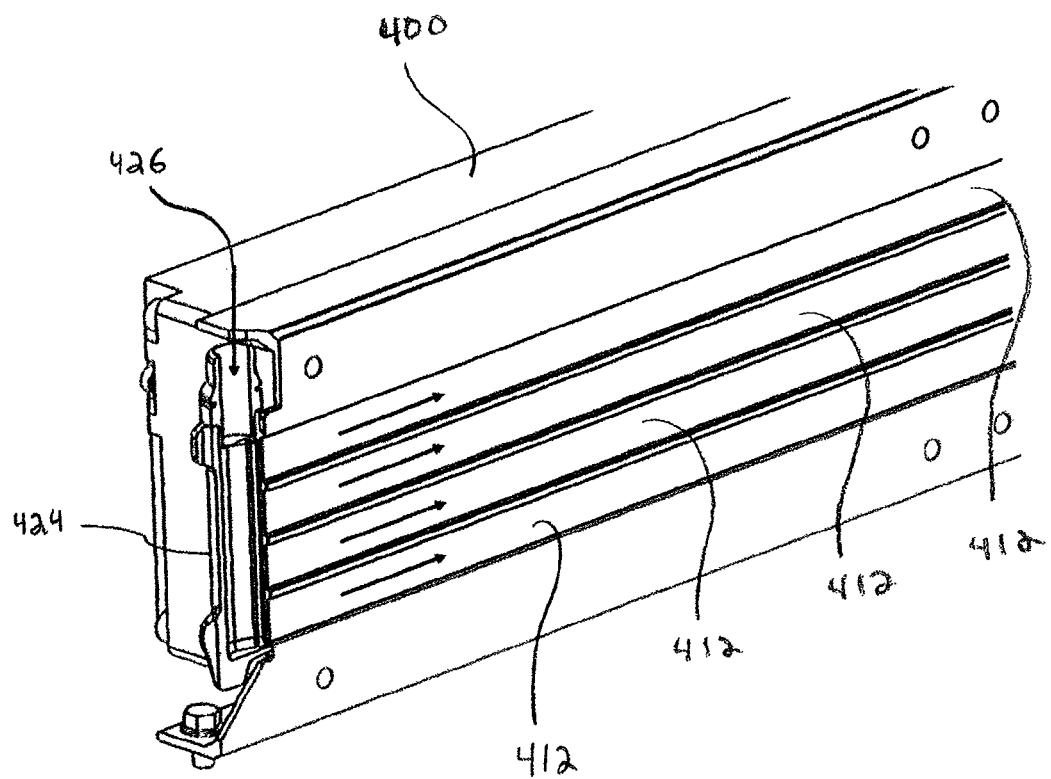
FIG. 24 illustrates a cutaway view of a battery module string on a support member having a fluid tank connected at its end.

In an embodiment illustrated in FIGS. 23 and 24, the support member 404 may include a fluid tank 424. The fluid tank 424 may be connected to or positioned at one or both ends of a support member 404. The fluid tank may include an inlet 426 to receive fluid from a fluid circulation system. The inlet 426 may be positioned at or near the top of the fluid tank 424. The fluid may be configured to flow into a fluid tank 424 at a first end of the support member 404, then through the fluid channels 412 and out into a fluid tank 424 at a second end of the support member 414. In an embodiment, the fluid tank 424 and fluid channels 412 may be connected to a fluid circulation system on the vehicle 10. The circulation system may be tied to or separate from other coolant/heating fluid circulation systems, such as an engine coolant system. The circulation system may include pumps, valves, and other similar devices to facilitate circulation of the fluid through the channels 412.

Figure 19A:
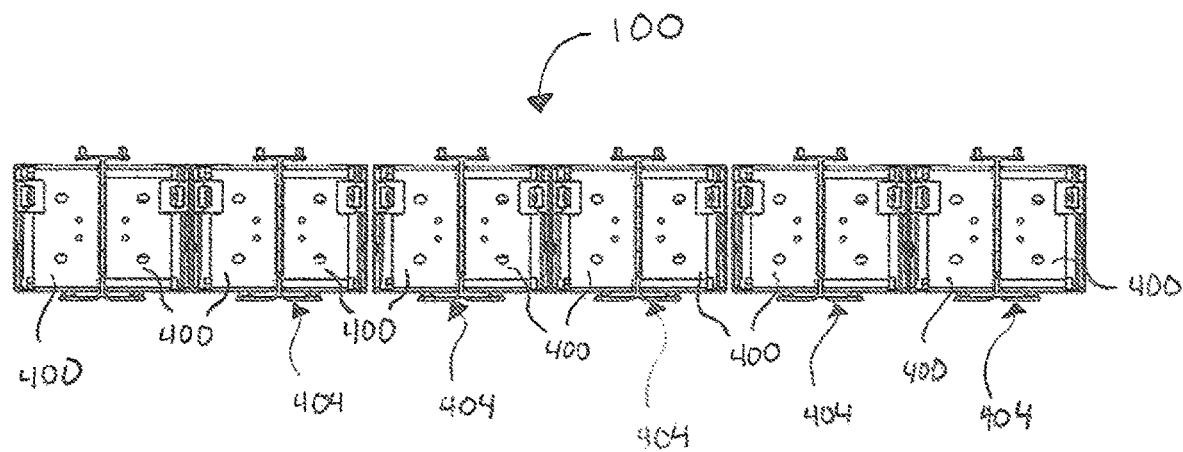
FIG. 19 a illustrates a side view of a battery pack composed of a plurality of module strings.
FIG. 19b illustrates a perspective view of a battery pack composed of a plurality of module strings.
Figure 19B:
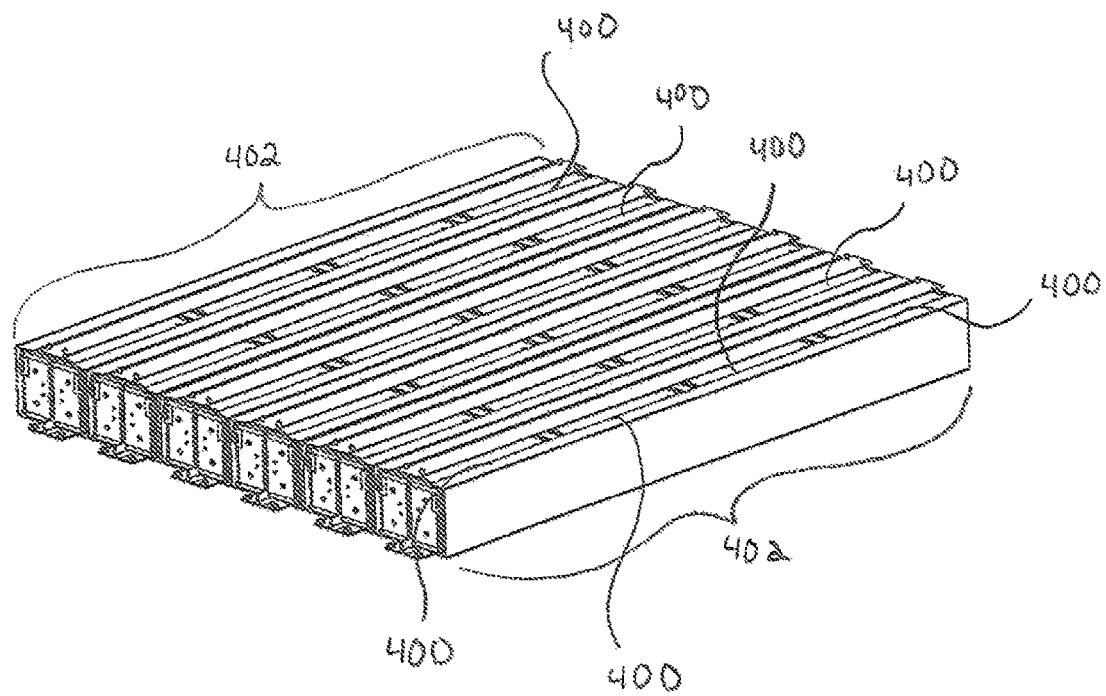

The fluid cooled support members 404, and cooling system, provide several benefits over known systems. First, the arrangement of the battery modules 400 along the support members 404 provides enhanced structural support over known battery arrangements. As shown in FIGS. 19a and 19b, the strings of modules 402 may be aligned, supported by the I-beam structural components 404, to provide structural support and rigidity for the vehicle. For example, the strings 402 may be arranged to extend from one side of the vehicle to the other side (such as left to right) to provide lateral rigidity of the body. Additionally, the temperature monitoring and control system implemented through the temperature sensors, vehicle controllers, pumps, heat exchangers/radiators/heaters, and the cooling fluid and fluid channel 406, provides improved temperature control over the battery modules 400.

Figure 25:
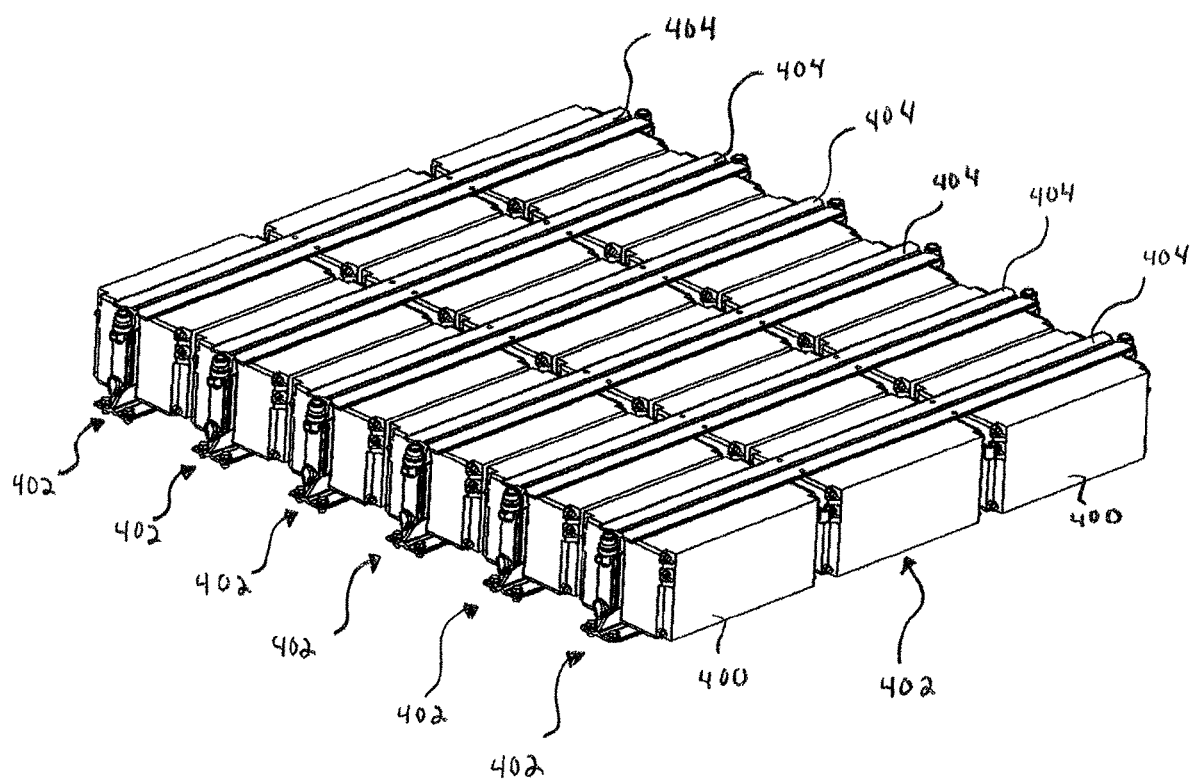
FIG. 25 illustrates an array of laterally adjacent battery module strings.
Figure 26:
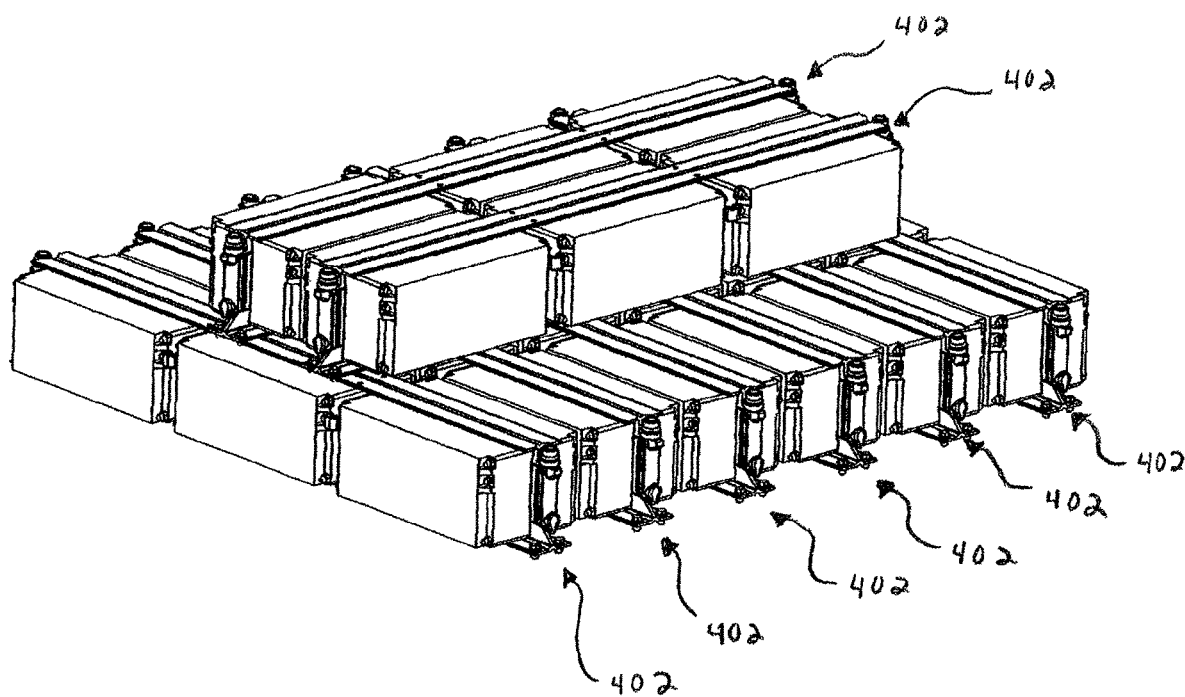
FIG. 26 illustrates an array of laterally adjacent battery module strings including vertically stacked module strings.

In an embodiment, the support members 404 may be configured to allow the battery modules 400 to be connected in module strings 402 and arranged or stacked in various configurations. The battery modules 400 within the module strings may be connected in series or parallel with one another, and multiple strings 402 may be connected in series or parallel together, depending on the desired electrical output. Structurally, the battery strings 402 may be arranged in an array, such as a series of strings 402 connected side by side and adjacent to one another, as shown in FIG. 25. The battery strings 402 may further be stacked on top of one another, as shown in FIG. 26. For example, the bottom plates 410 of one or more strings 402 may be configured to rest on the top plates 408 of an array of strings. The support members 404 may interconnected to increase the overall structural rigidity of the battery pack.

In an embodiment, the vehicle may include one or more gearboxes 500 to control the gear ratios between the electric drive motor and the wheels. As described herein, the gearboxes 500 may provide two separate gearing ratios, such as a high gear for higher speeds and a low gear for increased torque. However, it will be contemplated that additional gears may be included in the gearbox 500.

Figure 27:
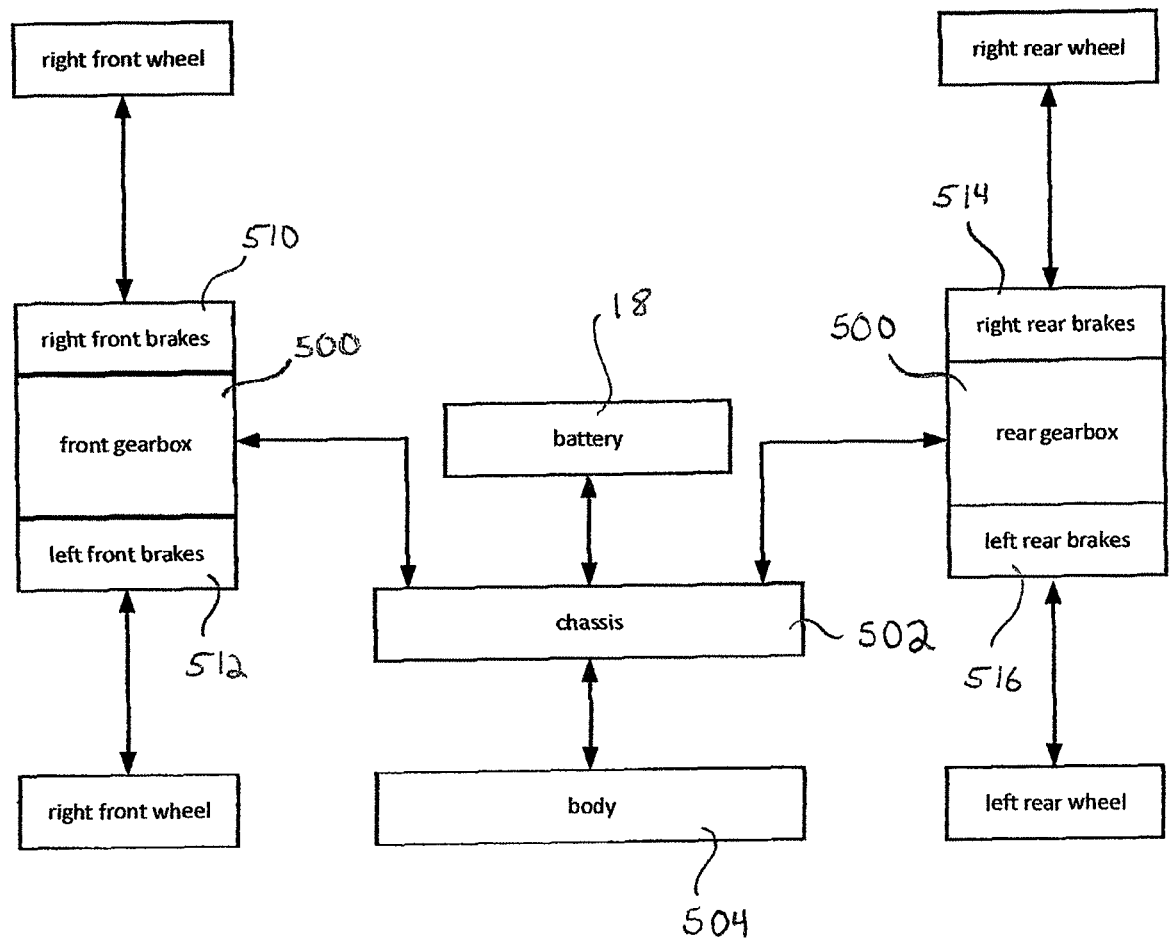
FIG. 27 illustrates a vehicle layout diagram related to the front and rear gearboxes.

With reference to FIG. 27, a vehicle layout diagram for a gearbox is generally shown. The chassis 502 is configured to support the battery or powertrain 18, such as described herein. The chassis 502 may further support the body 504 of the vehicle 10.

The chassis 502 may further support front and rear gearboxes 500. The front and rear gearboxes 500 may be positioned near corresponding front and rear drive units, and between the right and left front and rear wheels respectively. The front and rear gearboxes 500 may be generally configured to receive an input shaft from the respective front and rear electric drive motors and may output torque to the left and right wheels and one of two gearing ratios.

In an embodiment, the vehicle brakes may be arranged in an inboard configuration to its respective side of the front or rear gearbox 500. For example, the front right brakes 510 and front left brakes 512 may be mounted to and supported by the left and right sides of the front gearbox respectively, while the rear right brakes 514 and rear left brakes 516 may be mounted to and supported by the left and right sides of the rear gearbox respectively. This configuration is depicted in further detail in FIGS. 32 and 33 and described in further detail below. The inboard mounted brakes provide numerous benefits over brakes that are traditionally mounted near or at the wheels, including improved weight distribution and absorption of braking torque.

Figure 32:
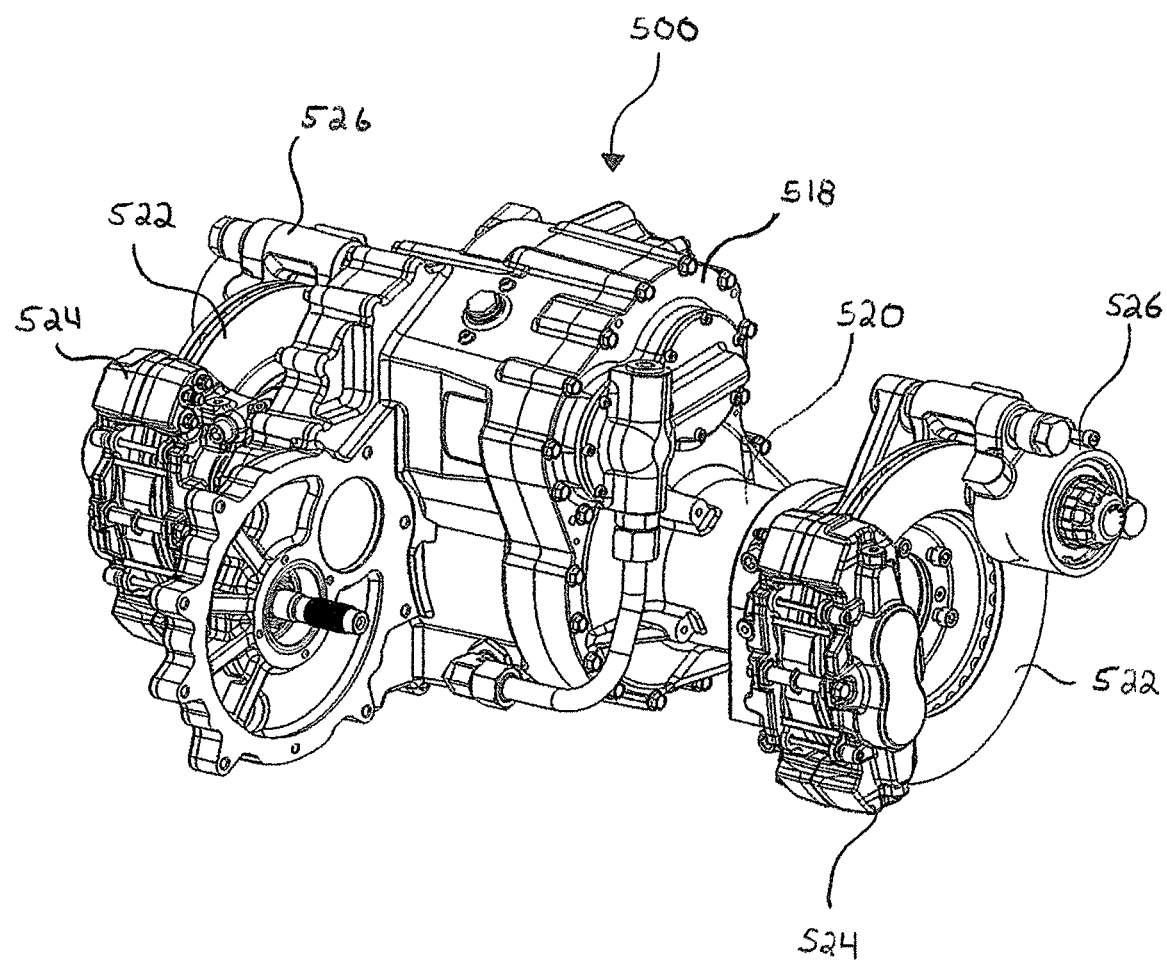
FIG. 32 illustrates a front perspective view of a gearbox with the outer housing attached.
Figure 33:
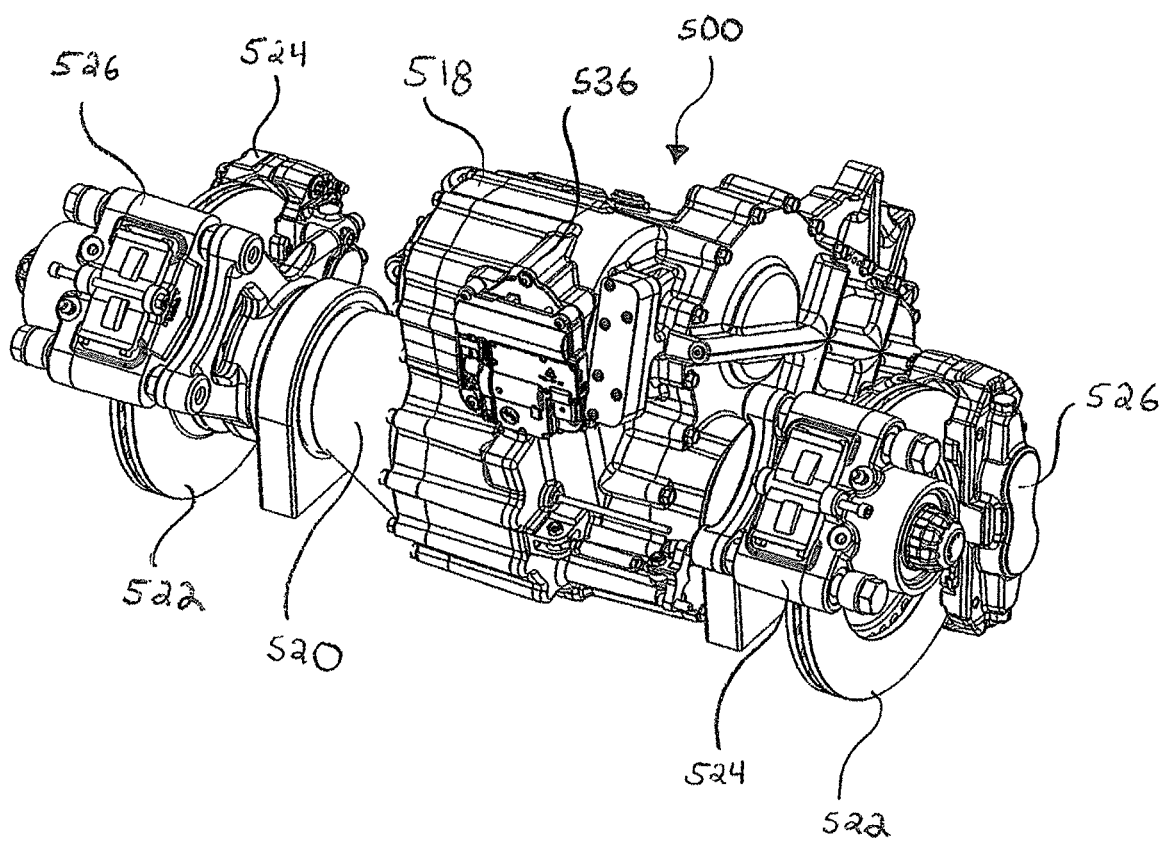
FIG. 33 illustrates a rear perspective view of a gearbox with an outer housing attached.

With reference to FIGS. 32 and 33, the gearbox 500 is shown with its outer housing 518 attached. An output shaft 520 extends from the right and left sides of the gearbox toward the respective wheels. A drive shaft, such as a flexible drive shaft (not shown) may connect to the output shaft 520 to drive rotation of the wheels. The brakes may be connected to the gearbox 500, before the drive shaft. As shown in FIGS. 32 and 33, a brake disc 522 may connect to the output shaft 520 and rotate therewith. The wheel brakes, including standard brakes 524 and a supplemental parking brake 526 may be mounted to the gearbox housing 518 and be arranged to engage and clamp the disc 522, such as using a caliper assembly.

Unlike traditional wheel brakes that are mounted at the vehicle wheel, the arrangement of the brakes shown and described herein provides numerous benefits. First, by moving the brakes inboard and toward the center of the vehicle, the unsprung weight of the vehicle may be reduced. Second, by mounting the standard brakes 524 to the gearbox housing 518, torque and forces that result from braking may be absorbed by the gearbox housing 18 instead of the drive shaft or other suspension components, thus reducing stresses on numerous components.

Figure 28:
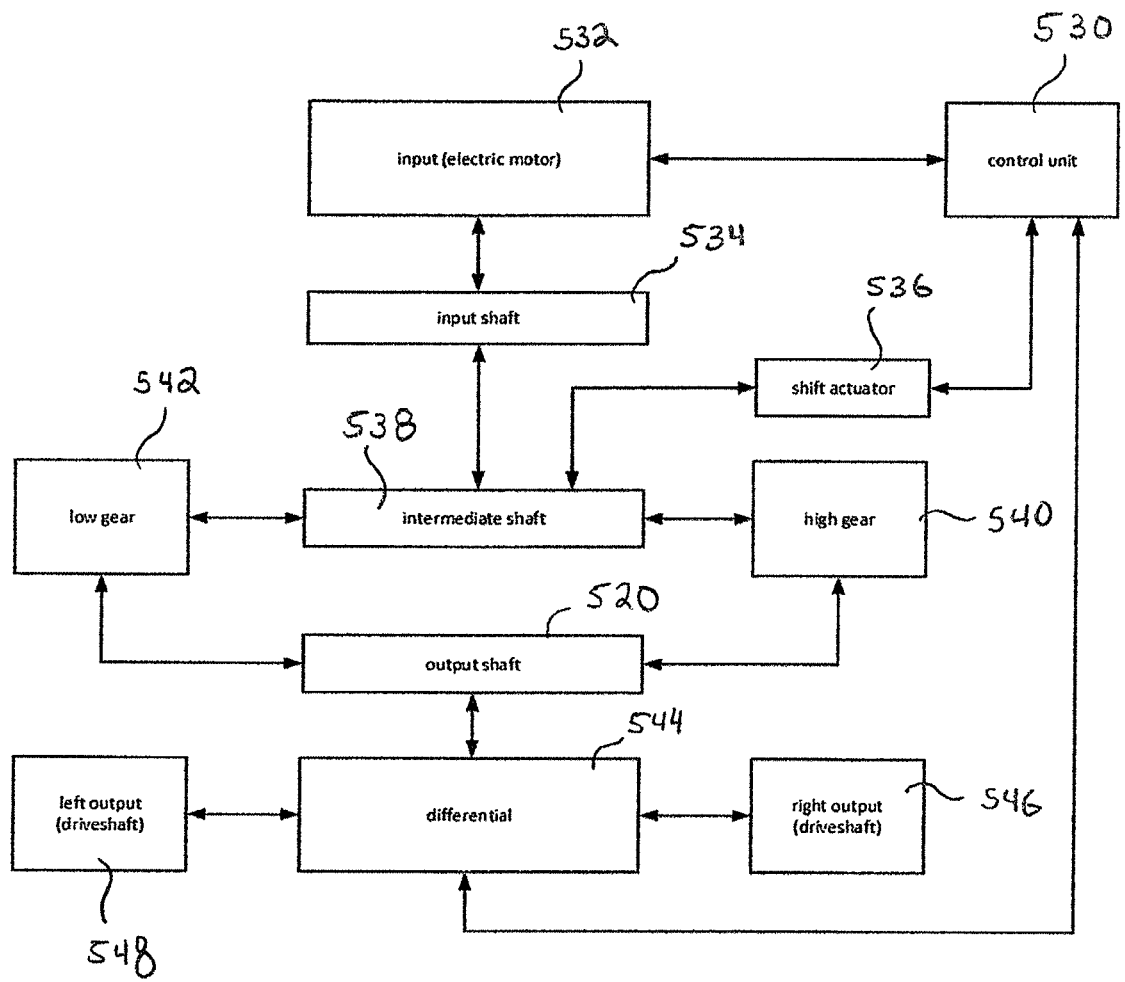
FIG. 28 illustrates a gearbox control block diagram.

With reference to FIG. 28, a gearbox control diagram is shown, to demonstrate how the shifting within the gearbox is controlled. A control unit 530 may generally monitor the vehicle conditions relevant to shifting gears and controlling the gearbox 500 and may initiate and control the shifting process. The control unit 530 may be a standalone controller that interfaces with other vehicle controllers or may be integrated with other controllers, such as the primary vehicle controller. The control unit 530 may both monitor and control the electric motor that drives the input shaft 534 to the gearbox 500. The control unit 530 may also monitor and control the shift actuator 536 that initiates shifting between gears. The shift actuator 536 may be an electric shift actuator positioned adjacent to the intermediate shaft 538.

The gearbox 500 may include an intermediate shaft 538 that may be shifted between two different gears, namely a high gear 540 and a low gear 542. The high and low gears 540, 542 may be positioned generally adjacent to one another along the intermediate shaft. The intermediate shaft 538 may be driven by the input shaft and may in turn drive the output shaft 520 through either the low or high gear 540, 542. The output shaft 520 extends laterally toward each of the wheels. The intermediate shaft 538 may specifically drive a differential gear 544 connected to the output shaft 520. The differential gear 544 may allow for variable torque and rotation speeds between the right and left wheels.

The differential 544 may be locked, such as by an electric differential lock actuator, to lock the torque that is applied to the left and right wheels. The differential lock may be initiated by a user and received as an input to the control unit 530. The control unit 530 may monitor vehicle conditions, such as speed and torque of the output shaft 520, to determine if locking the differential is allowed. If conditions are within predetermined ranges then the control unit 530 may initiate locking of the differential 544, locking the output to the left and right wheels.

Figure 29:
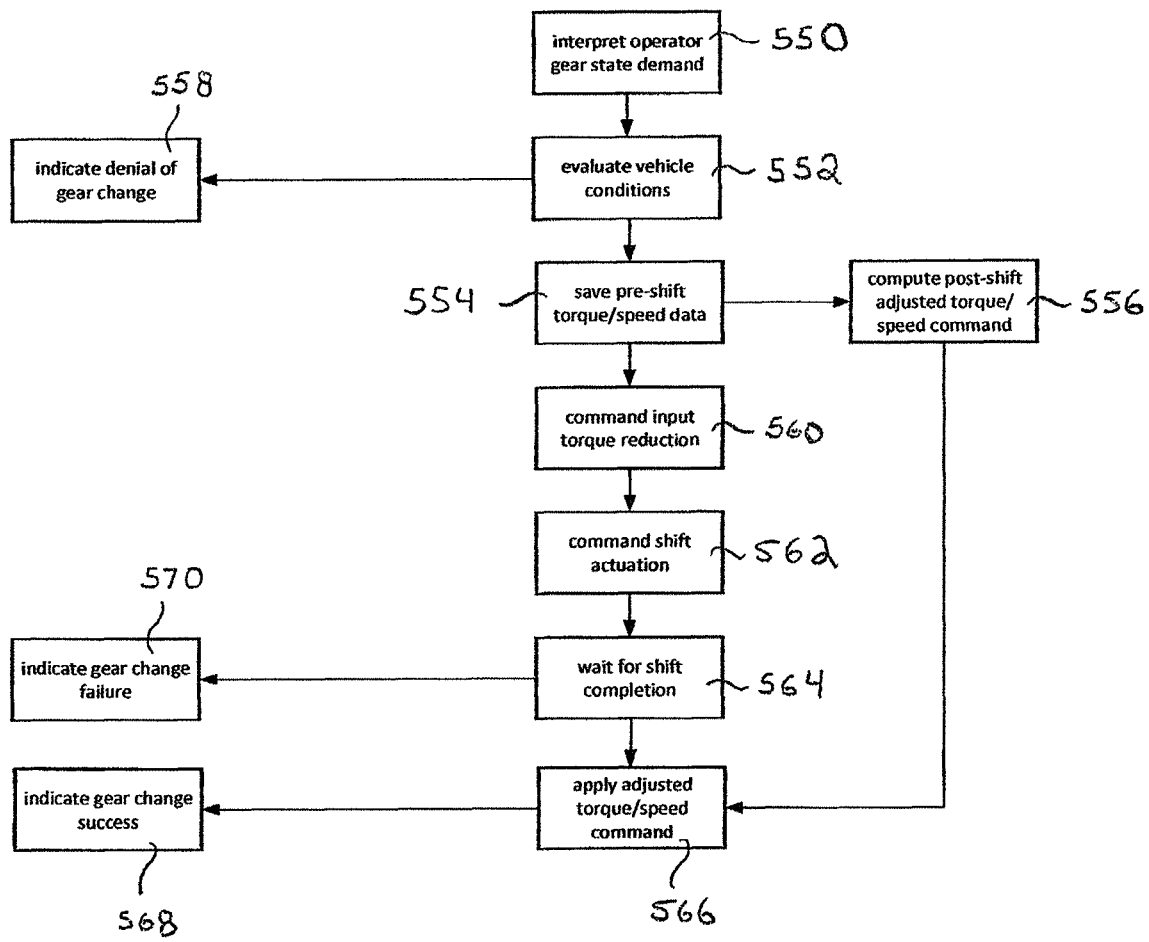
FIG. 29 illustrates a shift sequence flow chart for the gearbox.
Figure 30:
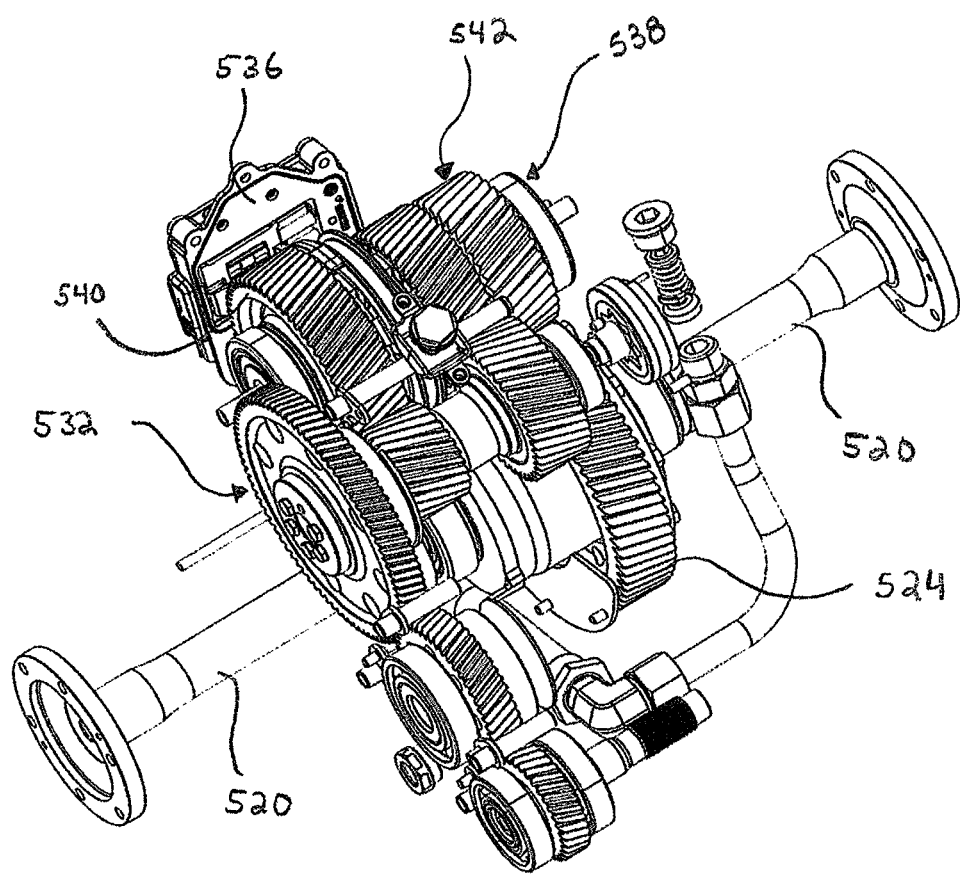
FIG. 30 illustrates a perspective view of a gearbox with the outer housing removed.
Figure 31:
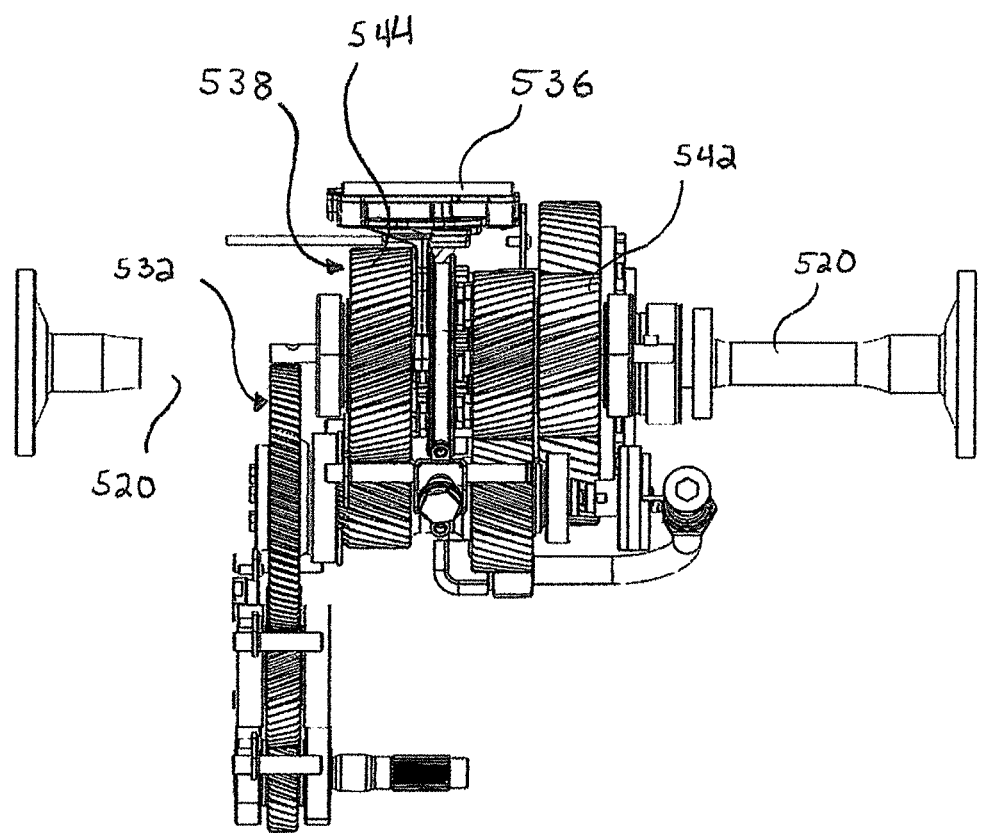
FIG. 31 illustrates a rear perspective view of a gearbox with the outer housing removed.

The control unit 530 may generally regulate and control the shift sequence, which is illustrated in the flowchart of FIG. 29. In a first step 550, the control unit 530 may interpret a gear state input from the vehicle operator. The gear state input may be a switch or dial located on the dashboard or adjacent to other operator controls that allows the operator to select between low and high gears. In a second step 552, the control unit 530 may evaluate the vehicle conditions to determine if shifting gears is safe. If the conditions are not safe, the control unit may indicate a denial of gear change 558, such as a temporary indication until conditions are safe. If the conditions are safe for a gear change, then the control unit 530 may save pre-shift torque and speed data 554. The pre-shift torque and speed data may then be used to compute a post-shift adjusted speed and toque commands to ensure consistent input to the drive shafts 546, 548.

To initiate the shift sequence, the control unit 530 will first command an input torque reduction 560 to allow for shifting of the gears. The control unit 530 will then command the shift actuation 562 to move the intermediate shaft 520. The control unit 530 will then wait for completion of the intermediate shaft movement 564. Once the shift is complete, the control unit 530 will apply the adjusted torque and speed 566 and indicate a successful shift 568. If the shift is not completed, then the control unit 530 will indicate a gear change failure 570.

In an embodiment, the gearbox 500 may include a mechanically driven lubrication pump. The pump may be attached to a shaft within the gearbox 500 to drive the pump when the gears are in motion and distribute lubrication to the gearbox 500 as needed. In an alternative embodiment, the gearbox 500 may include an electrically driven lubrication pump. The pump may be intelligently managed to operate the pump at dynamically changing speeds so as to distribute minimum required lubrication to the gearbox 500 as needed and simultaneously minimize energy consumption, noise, and vibration.

Figure 34:
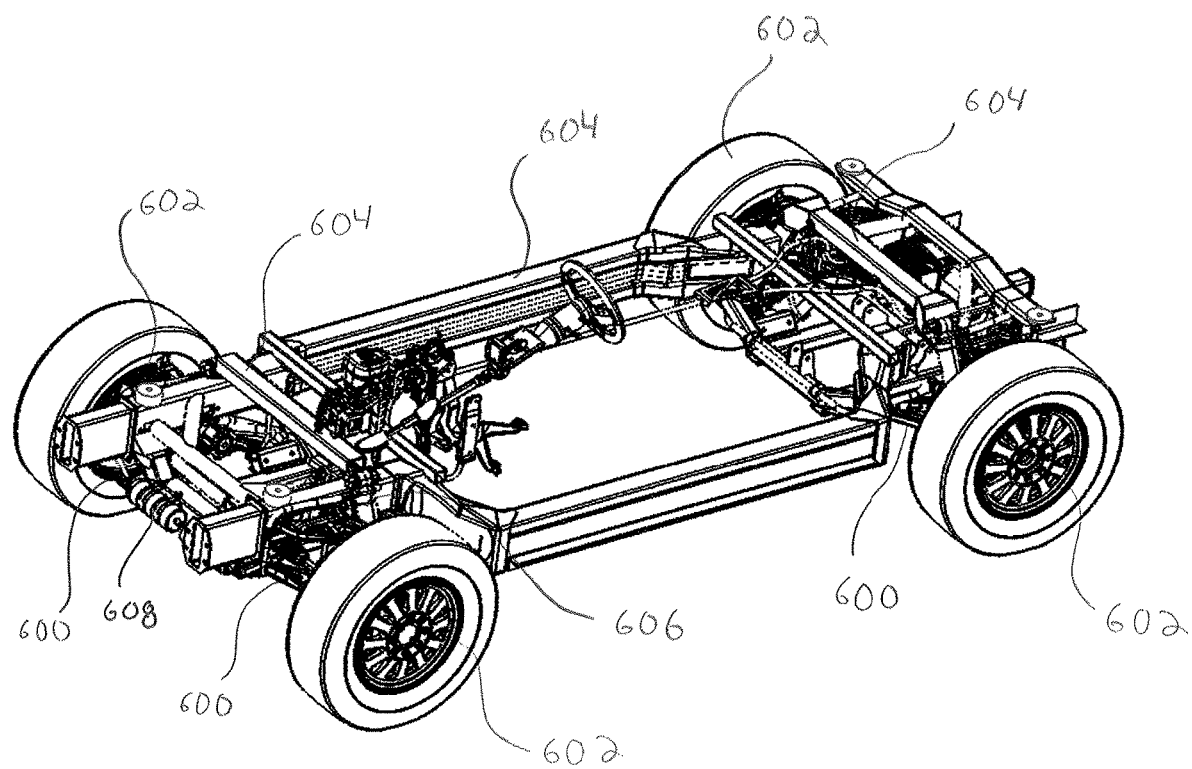
FIG. 34 illustrates a perspective view of a vehicle frame including hydraulic cylinders at each wheel.
Figure 35:
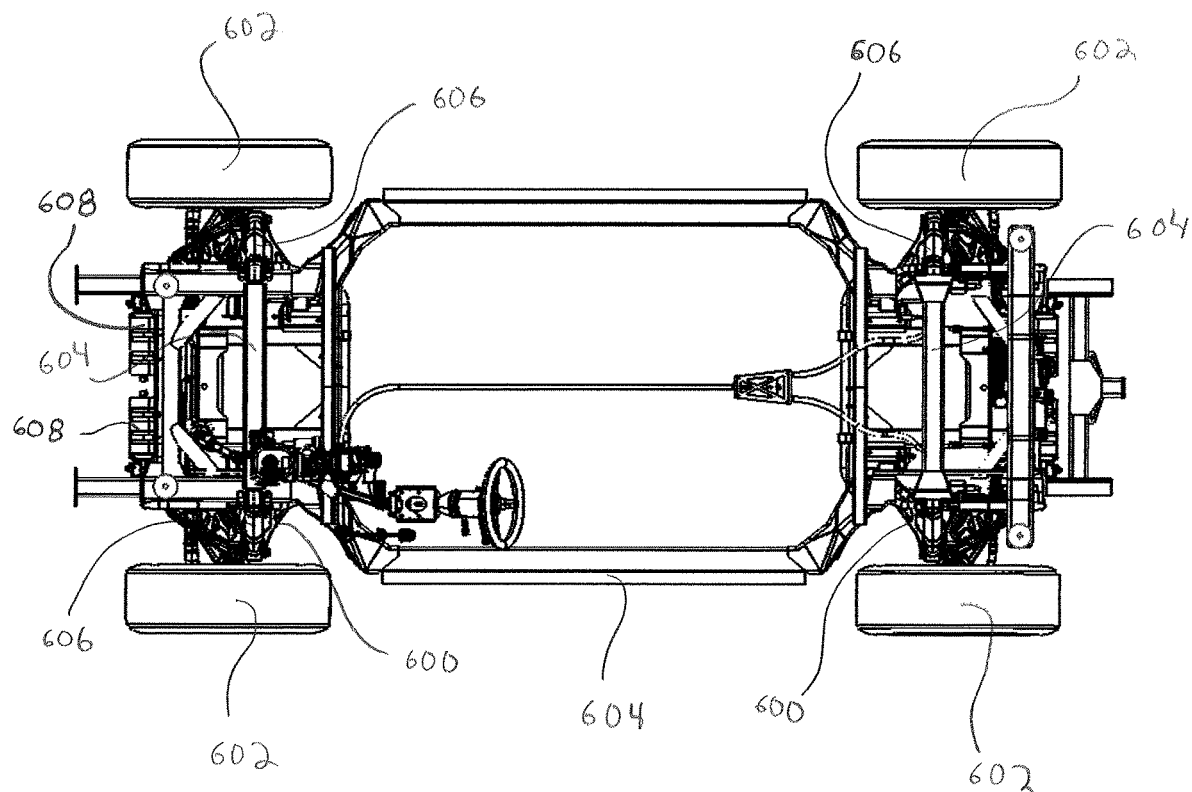
FIG. 35 illustrates a top view of a vehicle frame including hydraulic cylinders at each wheel.
Figure 36:
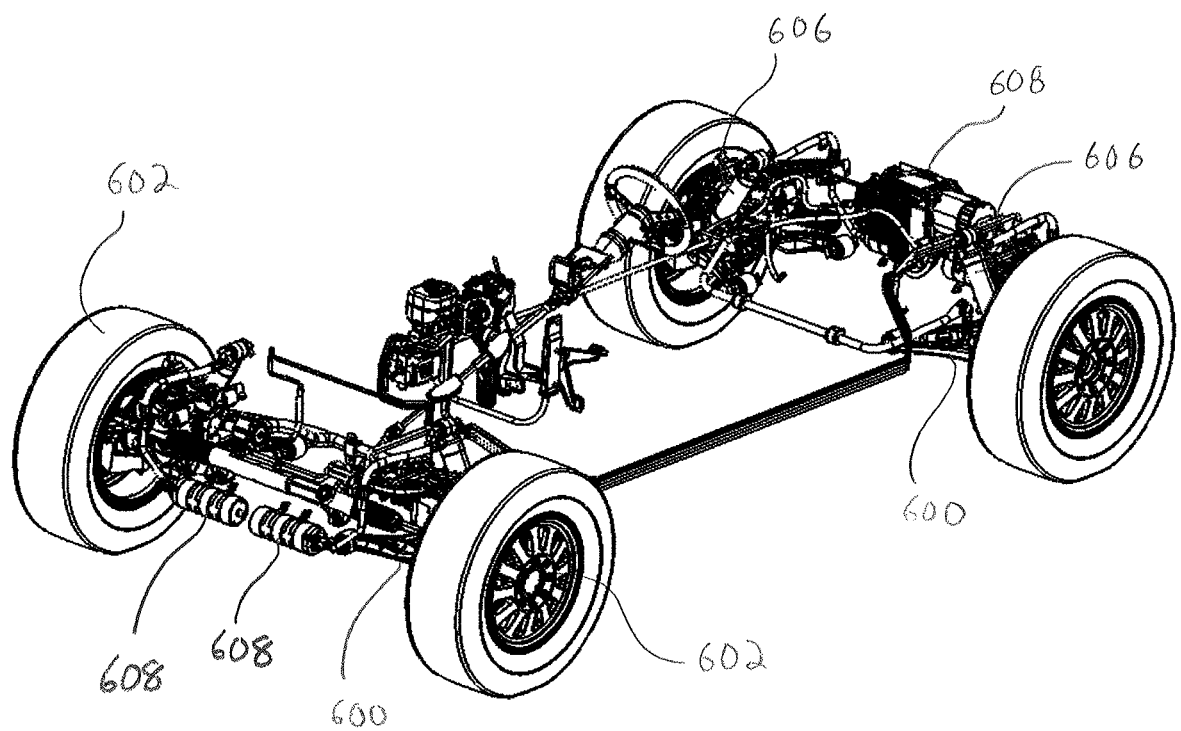
FIG. 36 illustrates a cutaway view of a vehicle having hydraulic cylinders, with the frame removed.

In an embodiment, as illustrated in FIGS. 34-36, the vehicle suspension may include dual A-arms 600 located at each corner of the vehicle. The dual A-arms 600 may comprise lower and upper A-arms 600 that interconnect the wheel and hub assembly 602 to the top and bottom of the vehicle frame 604. A hydraulic cylinder 606 is positioned at each wheel to provide spring, damping, and leveling functions. The hydraulic cylinder 606 may be attached at a first end to a portion of the vehicle frame 604 and at a second end to the connection point of the A-arm 600 and wheel and hub assembly 602. The suspension spring function is achieved using the hydraulic cylinder 606 coupled with a hydraulic accumulator 608. The suspension damper function is achieved using restriction of fluid flow to and from the hydraulic cylinder 606.

The vehicle may further include position and pressure sensors at each suspension corner to determine relative vehicle ride height. The position sensors may be configured to measure the position of the vehicle frame 604 relative to the ground or to the wheels. The pressure sensor may measure the pressure within the hydraulic cylinder 606. The position and pressure sensors may report back to a vehicle control unit that may adjust the ride height under various conditions. The vehicle control unit may utilize the sensor feedback to measure the vehicle height and may adjust ride height up or down according to operator preference or based on predetermined thresholds. Further, the control unit can detect unequal loading and height from front to rear and left to right and correct this condition. The height adjustments may be made by adjustment of hydraulic cylinder 606 position at each corner in an intelligent manner.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

We claim:

1. An electric automotive vehicle comprising:
   a plurality of wheels connected to a frame;
   a plurality of batteries connected to the frame;
   a gear reduction located at each of the plurality of wheels; and
   front brakes and rear brakes mounted inboard of the gear reduction of each of the plurality of wheels;
   wherein the electric automotive vehicle includes a central axis; wherein the plurality of batteries are positioned at a base of the frame; wherein a weight of the plurality of batteries is centered about the central axis.

2. The electric automotive vehicle of claim 1, wherein the central axis is geometrically centered on the electric automotive vehicle and extends from a front of the electric automotive vehicle to a rear of the electric automotive vehicle.

3. The electric automotive vehicle of claim 2, further comprising a drivetrain;
   wherein all components of the drivetrain are positioned above a base of the plurality of batteries.

4. The electric automotive vehicle of claim 3, wherein the electric automotive vehicle has a gross vehicle rating of greater than 10,000 pounds.

5. The electric automotive vehicle of claim 4, further comprising:
   a front axle and a rear axle;
   a first gearbox and a second gearbox, each of which including a high gear and a low gear; and
   a first electric drive unit that drives the front axle via the first gearbox and a second electric drive unit that drives the rear axle via the second gearbox;
   wherein independent torque control of the front and rear axles is provided via the first and second gearboxes.

6. The electric automotive vehicle of claim 5, wherein the electric automotive vehicle senses speed and/or torque feedback at each of the front and rear axles or of each of the plurality of wheels, adjusts a torque to each of the front and rear axles or of the plurality of wheels via the first and second gearboxes and/or the gear reduction at each of the plurality of wheels, and balances the torque as needed based on the speed and/or torque feedback.

7. The electric automotive vehicle of claim 4, further comprising an inverter charger, wherein the inverter charger powers auxiliary AC loads and outlets; and wherein the inverter charger charges the plurality of batteries when plugged into an appropriate power source.

8. The electric automotive vehicle of claim 7, wherein the vehicle includes a plurality of power modes that dictate which systems within the electric automotive vehicle are powered; wherein the plurality of power modes comprise:
   a charge mode to turn the plurality of batteries on or awake and capable of receiving a charge but restricted from powering any auxiliary or system devices;
   an export mode configured to turn the plurality of batteries on and allow for only AC outlets on the electric automotive vehicle to be powered on while cutting power to all other components; and
   a mobility mode configured to turn on the plurality of batteries and all powered components including the drivetrain.

9. The electric automotive vehicle of claim 4, wherein the plurality of batteries comprise one or more battery strings;

wherein each of the one or more battery strings comprises a plurality of electrically coupled battery modules connected to a temperature-regulated I-beam.

10. The electric automotive vehicle of claim 5, wherein the electric automotive vehicle includes one or more vehicle controllers that operably change between an on-road mode and an off-road mode; wherein in the on-road mode, gearing of the first and/or second gearboxes is changed to realize a high range mode; and wherein in the off-road mode, gearing of the first and/or second gearboxes is changed to realize a low range mode.

11. The electric automotive vehicle of claim 5, further comprising:
- a plurality of hydraulic cylinders positioned between each of the plurality of wheels and the frame; and
- a hydraulic pump plumbed in-line with the plurality of hydraulic cylinders; and
- wherein the plurality of hydraulic cylinders damp and suspend the electric automotive vehicle, independently adjust a height of the electric automotive vehicle, or both.

12. The electric automotive vehicle of claim 5, wherein the front brakes are mounted in an inboard arrangement to a casing of the first gearbox and wherein the rear brakes are mounted in an inboard arrangement to a casing of the second gearbox.

13. The electric automotive vehicle of claim 5, wherein the plurality of batteries include a front facing power connection and a rear facing power connection to connect to the first electric drive unit and the second electric drive unit, respectively; and wherein the front facing and rear facing power connections are located proximate to the first and second electric drive units, respectively.

14. The electric automotive vehicle of claim 5, comprising an A-arm at each of the plurality of wheels; and wherein the front brakes and the rear brakes are located inboard of a connection point between the A-arm and each of the plurality of wheels.

15. An electric automotive vehicle comprising:
- a frame;
- a plurality of wheels connected to the frame;
- a central axis geometrically centered thereon and extending from a front to a rear of the electric automotive vehicle;
- a plurality of batteries connected to and positioned at a base of the frame, a weight of the plurality of batteries being centered about the central axis;
- a drivetrain positioned above a base of the plurality of batteries;
- a front axle and a rear axle;
- a first gearbox and a second gearbox, each of which including a high gear and a low gear;
- a first electric drive unit that drives the front axle via the first gearbox; and
- a second electric drive unit that drives the rear axle via the second gearbox;
- wherein the electric automotive vehicle has a gross vehicle rating of greater than 10,000 pounds; and
- wherein independent torque control of the front and rear axles is provided via the first and second gearboxes.

16. The electric automotive vehicle of claim 15, comprising a gear reduction located at each of the plurality of wheels.

17. The electric automotive vehicle of claim 16, comprising front brakes and rear brakes mounted inboard of the gear reduction of each of the plurality of wheels.

18. The electric automotive vehicle of claim 17, comprising an A-arm at each of the plurality of wheels; and wherein the front brakes and the rear brakes are located inboard of a connection point between the A-arm and each of the plurality of wheels.

19. The electric automotive vehicle of claim 17, wherein the front and rear brakes are mounted to the first and second gearboxes, respectively.

* * * * *

UNITED STATES PATENT AND TRADEMARK OFFICE
CERTIFICATE OF CORRECTION

PATENT NO. : 11,964,535 B2
APPLICATION NO. : 17/068318
DATED : April 23, 2024
INVENTOR(S) : Robert Bollinger et al.

Page 1 of 1

It is certified that error appears in the above-identified patent and that said Letters Patent is hereby corrected as shown below:

In the Claims

Column 14, Line 52, Claim 8 insert --electric automotive-- after "wherein the"

Column 15, Line 1, Claim 9 delete "comprises a" and insert --comprise a--

Signed and Sealed this
Sixteenth Day of July, 2024

Katherine Kelly Vidal
*Director of the United States Patent and Trademark Office*